US007950998B2

(12) United States Patent
Ueda et al.

(10) Patent No.: US 7,950,998 B2
(45) Date of Patent: May 31, 2011

(54) BILLING MANAGEMENT SYSTEM FOR GAME MACHINE

(75) Inventors: Noriaki Ueda, Tokyo (JP); Keisuke Yasui, Tokyo (JP); Yoichi Tanaami, Tokyo (JP); Shinich Furuhashi, Tokyo (JP); Yusuke Shimizu, Tokyo (JP); Kazunori Nishisaka, Tokyo (JP); Yuki Yamanaka, Tokyo (JP); Mio Kanie, Tokyo (JP)

(73) Assignee: Sega Corporation, Tokyo (JP)

( * ) Notice: Subject to any disclaimer, the term of this patent is extended or adjusted under 35 U.S.C. 154(b) by 1035 days.

(21) Appl. No.: 11/806,259

(22) Filed: May 30, 2007

(65) Prior Publication Data

US 2008/0000750 A1 Jan. 3, 2008

(30) Foreign Application Priority Data

Jun. 30, 2006 (JP) ................................ 2006-181744

(51) Int. Cl.
*G06F 17/00* (2006.01)

(52) U.S. Cl. ........................................................ 463/25

(58) Field of Classification Search .............. 463/16–25; 705/35

See application file for complete search history.

(56) References Cited

U.S. PATENT DOCUMENTS

2006/0080539 A1* 4/2006 Asami et al. .................. 713/182
2009/0104954 A1* 4/2009 Weber et al. ....................... 463/1
2009/0104965 A1* 4/2009 House et al. ..................... 463/20
2009/0143141 A1* 6/2009 Wells et al. ..................... 463/37

FOREIGN PATENT DOCUMENTS

JP 2002-150420 5/2002

* cited by examiner

*Primary Examiner* — Ronald Laneau

(74) *Attorney, Agent, or Firm* — Dickstein Shapiro LLP

(57) ABSTRACT

A collective system for billing management of each game machine installed in shops or the like via communication network. A limit is set to the usable number, while the game machine is ensured continuous use as long as it is properly used and the billing is carried out regularly during the continuous use on a pay-per-use basis. The play count is counted up every time one game is played, and when the play count has reached or exceeded a count limit, the use of the game machine is restricted. The game machine is connected to a billing server via a communication network. The billing server includes a count limit renewing unit which renews the count limit of the game machine that has transmitted billing information, and transmits the new count limit back to the game machine every time the billing server receives the billing information from the game machine.

24 Claims, 14 Drawing Sheets

FIG.3

| RECORD NO. | DATE AND TIME | GAME ID | CREDIT CONSUMPTION | MAIN BOARD ID | SHOP ID |
|---|---|---|---|---|---|
| 1 | 2006.02.01.13:20 | 00010 | 3 | xxxxxx | xxxxxx |
| 2 | 2006.02.01.12:10 | 00011 | 2 | xxxxxx | xxxxxx |
| 3 | 2006.02.01.13:30 | 00009 | 1 | xxxxxx | xxxxxx |
| ⋮ | ⋮ | ⋮ | ⋮ | ⋮ | ⋮ |

BILLING MANAGEMENT SYSTEM FOR GAME MACHINE

BACKGROUND OF THE INVENTION

The present invention relates to a billing management system for game machines, billing management servers and game machines incorporated in the system, a billing management program that allows a server to operate as a billing server, and a billing management method that uses this system.

Arcade video game machines allow the user to start a game upon an input of credits incurred by insertion of or payment by coins, paper money, prepayment cards, electronic money, medals, and the like. After an input of credits necessary for playing one game, the game control program is initiated in response to a start signal input from the player. The game machines accumulate records of credits that are consumed per each play.

In one mode of business, arcade game machines are entirely or partly (for example, game software) lent to game machine administrators on the basis of a lease contract. The lease provider charges the game machine administrators for the use of the game machines, and the game machine administrators pay the bills to the lease provider from part of their profits.

The billing is made on a pay-per-use basis, usually on the basis of the count value of a play counter equipped in the game machines. The lease provider checks the play counters of the leased game machines regularly to obtain information necessary for the billing.

When there are many lease users, however, this billing process requires a large amount of work to obtain the billing information, and it is difficult to provide swift management service for all of the lease users. Therefore, a collective billing management system has been proposed, in which leased game machines are connected to a communication network and the management including billing is controlled through the network.

Japanese Patent Application Laid-Open No. 2002-150420 describes a system, in which a machine management center communicates with leased (rental) machines supplied by a lease (rental service) provider over a communication network via a base station that transmits and receives wireless signals to and from the leased machines. The leased machines are inoperative when delivered to the users, and after a request for operable condition is received from the leased machines, the machine management center transmits an electronic key to the leased machines to enable the machines to be operated. Also disclosed in this conventional technique is that the electronic key includes information on how many times the leased machines can be used, and that the number of times the leased machines are turned on is counted from the time when the machines were rendered operative, and the machines are disabled after they have been turned on the preset allowable number of times.

With this conventional technique, the pay-per-use billing could be made on the basis of the information on the allowable number of uses contained in the electronic key. However, since the number of times the machine has been used is made available only after the machine has been used the preset allowable number of times and rendered inoperative, it is not possible to perform the pay-per-use billing process regularly or irregularly during continuous use of the machine. Arcade game machines are usually installed in 24-hour operating shops or amusement places and always operative. If the allowable number of uses in the electronic key is set high so as to ensure prolonged continuous use of the machines, pay-per-use billing for a short period of, for example, one day would be impossible. On the other hand, if the allowable number of uses is set low to enable the short cycle billing and settlement, the machines would be disabled frequently because of the billing, which would be incompatible with the 24-hour operating business mode and would affect the business profit adversely.

Regular pay-per-use billing while ensuring continuous use of the game machines would be possible without a limit on the usable number and with the center communicating with the leased machines over a communication network to access the use history data of the machines and obtain billing information.

However, since arcade game machines are usually operative both on-line and stand-alone, if the machines are disconnected from the center willfully or due to a network failure, the use history data of the machines accessed by the center will be incomplete, and accurate pay-per-use billing will be impossible.

Also, without the limit on the usable number, the center cannot monitor proper use of the leased machines and restrict abusive use of the machines such as a willful act of using the machines in a stand-alone state, which is a breach of the lease contract.

Another problem with the above-described conventional technique is that the allowable number of uses is contained in the electronic key sent to the leased machines and this number of times of use is set in the machine when it is turned on for the first time, it being not changeable afterwards irrespective of possible changes in the situation. Therefore it is not possible to control the limit on the number of times the machines can be used flexibly in accordance with the situation in which the machines are used, or with the billing history or various circumstances on the side of the machine administrators.

SUMMARY OF THE INVENTION

In view of the foregoing, it is an object of the present invention to provide a collective system for billing management of game machines installed in shops or the like via a communication network, in which, while a limit is set to the usable number, the game machines are ensured continuous use as long as they are properly used, and the billing is carried out on a pay-per-use basis regularly during the time span of the continuous use. Another object of the invention is to provide a billing management system, with which accurate pay-per-use billing is possible for each game machine even if the network connection is interrupted by a willful actor due to a network failure, and with which unauthorized use of the machines such as attempting to use the machines stand-alone on purpose is properly restricted. Yet another object of the invention is to provide a billing management system, with which the limit to the usable number (continuous use limit) of each game machine is changeable in accordance with various situations, so as to enable flexible and appropriate control over the use of each game machine.

To achieve the above objects, the present invention provides a billing management system for a game machine including: a billing server connected to a communication network and a game machine that can transmit and receive information to and from the billing server through the communication network, wherein the billing server performs a billing management process on the basis of billing information sent from the game machine to the billing server on a pay-per-use basis. The game machine includes: a game control unit for executing a game program in accordance with an input signal; game play restricting means for counting up a play count every time a game is played by the execution of the game program and for restricting the execution of the game program in the game control unit when the counted-up play count reaches or exceeds a preset count limit; and billing information transmitting means for transmitting billing information to the billing server through the communication network at a preset timing, the billing information including at least the play count. The billing server includes: billing information receiving means for receiving the billing information sent from the game machine; billing means for performing a billing process for each game machine on the basis of the received billing information; and count limit renewing means for, every time the billing server receives the billing information, renewing the count limit of the game machine that has transmitted the billing information and transmitting the renewed count limit back to the game machine that has transmitted the billing information. The game play restricting means of the game machine receives the renewed count limit and changes a current count limit to the renewed value.

A billing management method for a game machine in accordance with the present invention uses this billing management system that includes a billing server connected to a communication network and a game machine that can transmit and receive information to and from the billing server through the communication network. In this method, a billing management process is performed on the basis of billing information sent from the game machine on a pay-per-use basis. The billing management method for the game machine includes: a game play restricting step of counting up a play count every time a game is played by the execution of the game program in the game machine and restricting the play of games in the game machine when the counted-up play count reaches or exceeds a preset count limit; a billing information transmitting step of transmitting the billing information to the billing server through the communication network at a preset timing, the billing information including at least the play count; a billing information receiving step of allowing the billing server to receive the billing information sent from the game machine; a billing step of performing a billing process for each game machine on the basis of the received billing information; a count limit renewing step of renewing the count limit of the game machine that has transmitted the billing information every time the billing information is received, and transmitting the renewed count limit back to the game machine that has transmitted the billing information; and a changing step of allowing the game machine to receive the renewed count limit to change a current count limit to the renewed value.

The characteristic features of a billing management program are that it is run on a computer allowing it to function as a billing server that is connected to a game machine through a communication network and that performs a billing management process on the basis of billing information sent from the game machine on a pay-per-use basis, the game machine including game play restricting means for restricting the play of games when a play count that is counted up every time a game is played reaches or exceeds a preset count limit. The program allows the computer to function as the billing information receiving means, the billing means, and the count limit renewing means described above.

The characteristic features of the game machine in the billing management system are that it is a game machine that can transmit and receive information to and from the billing server through the communication network, and includes the game control unit, the game play restricting means, and the billing information transmitting means described above. The game play restricting means receives the count limit that has been renewed by the billing server and changes a current count limit to the renewed value, after the billing information transmitting means has transmitted the billing information to the billing server.

The game machine further includes play history recording means for recording play history information every time a game is played by running the game program, and the game play restricting means counts up the play count every time the play history information is recorded.

The billing management system or method for a game machine, the billing server, the billing management program, and the game machine provide the following advantages.

Since the count limit is renewed after the billing information is transmitted to the billing server, it is only necessary for the game machine to transmit the billing information to the billing server before the play count exceeds the current count limit in order to ensure continuous use of the game machine.

On the other hand, since the billing information is sent from the game machine at the timing that is preset in the game machine, the billing server can perform the billing process regularly in accordance with the preset timing, while at the same time ensuring continuous use of the game machine. In other words, granting the continuous use of the game machine enables regular billing without adversely affecting the operating income of the shop.

The play history information is first recorded in the game machine, and sent as part of the billing information to the billing server at the preset timing. Therefore, even if the game machine is disconnected from the billing server, this play history information provides the information as to how the game machine was being used during the disconnected period and enables the billing server to perform a billing process accurately on a pay-per-use basis for each discrete game machine. This enables collective billing management of each of a large number of game machines in accordance with the number of uses.

If a game machine is disconnected from the network on purpose and continuously used without transmitting its own billing information, the play count, which is counted up every time one game is played, will soon exceed the count limit because it is not renewed until the billing information is transmitted. Thus, continuous use of that game machine that has failed to transmit the billing information is restricted within the limit of the count limit.

Even if a game machine is disconnected from the billing server due to a network failure or the like and fail to transmit the billing information, game machine can still be used within the limit of the count limit. This can prevent possible adverse effects on the operating income because of accidental network failure.

In one embodiment of the invention, the count limit renewing means in the billing server may renew the count limit by adding a default count limit to the received play count. That is, every time the billing server receives the billing information, a default count limit is added to the current play count, and the new value replaces the current count limit of the game machine. Therefore, by transmitting the billing information, the game machine is granted a new usable number that equals to the added count limit.

In another embodiment, the count limit renewing means in the billing server may change the new usable number by renewing the count limit in various ways depending on the situation, so as to allow the billing server to control the use of the game machine.

For example, the count limit renewing means may renew the count limit by adding a set value to the received play count, and this set value may be changed in accordance with receipt histories of the billing information for each game machine.

With this processing, the set value equals to the usable number of the game machine. This is changed in accordance with the receipt histories of billing information for each game machine. For example, if the receipt histories show that the game machine is situated in an area with a poor network connection, the set value may be set higher than a default set value so as to grant the game machine a sufficient usable number and to permit the game machine to be used continuously despite network connection failures. Or, if the receipt histories indicate that the network connection may have been disabled frequently on purpose, the set value may be set lower than a default set value so that the game machine can be used only a limited number of times and that any loss incurred by unauthorized use is minimized.

In another embodiment, the billing server may include business plan information of a server administrator, and the count limit renewing means may renew the count limit by adding a set value to the received play count, this set value being changed in accordance with the business plan information.

This processing enables flexible billing management in accordance with the business plan of the server administrator. For example, the set value may be set lower than a default set value to receive the play history information frequently for more stringent management of the game machine. This way, the number of times the game machine can be used is limited more and the game machine is made to send billing information more frequently. Or, when the server administrator cannot carry out the management process of game machines for a long period of time because of a series of non-business days or the like, the set value may be set higher than the default set value so as to grant the game machine a large usable number and to permit the game machine to be used continuously free of the management schedule of the server administrator.

In yet another embodiment, the billing server may include installation area information on an installation area of the game machine, and the count limit renewing means may renew the count limit by adding a set value to the received play count, this set value being changed in accordance with the installation area information.

This processing facilitates management of discrete game machines that are installed in a variety of areas. For example, for a game machine that is situated in an area with a poor network infrastructure where connection failures occur frequently, the set value may be set higher than a default set value so as to grant the game machine a large usable number and to enable the game machine to be used continuously despite frequent network failures. Also, if the area information indicates that particular game machines are expected to be used intensively, the set value may be set higher than the default set value so as to grant the game machines a sufficient usable number and to enable the game machines to be used continuously despite the intensive use.

In a further embodiment, the billing server may include misuse detection means for detecting unauthorized use of the game machine on the basis of the received billing information, and while the count limit renewing means renews the count limit by adding a set value to the received play count, it may change this set value to zero if the misuse detection means detects unauthorized use.

With this processing, if the received billing information indicates any unauthorized use of one of the game machines that are discretely controlled, the set value is changed to 0, thereby canceling the permission of further use and immediately disabling the game machine in question.

In another embodiment, the billing server may include a website that can be accessed from a terminal device that has communication functions, the terminal device connected to the website enabling searching, browsing, and changing of the billing information stored in the billing server and game machine information generated by the billing server on the basis of the billing information.

With this feature, when a malfunction occurs in one of the game machines, a service person on site can access the website of the billing server from the terminal device that has communication functions such as a mobile phone, and can search, browse, or change the billing information stored in the billing server, as well as the game machine information generated by the billing server on the basis of the billing information, which enables the person to specify the cause of the malfunction of that game machine easily and to take proper measures quickly. The “game machine information” generated by the billing server on the basis of the billing information received from the game machine includes, for example, a “remaining number of games playable,” which is obtained by deducing the play count from the count limit of the game machine, an “average number of games played per day/hour,” which can be obtained from the play count, and the like.

In a specific embodiment, the game machine may include a start-up control unit that enables a game to be started upon an input of credits, and the play history information may include information on how many credits have been consumed through playing previous games. This enables the billing server to keep track of how the game machine has been used on the basis of the credits consumed and to perform the billing process in accordance with the consumed credits. This enables, for example, billing by credits consumed and not by a number of games played, for a type of game in which several credits may be consumed during one game.

Also in a specific embodiment, the game machine may be controlled such that, if a game is being played by the game control unit at a timing that is set for transmitting the billing information, the billing information transmitting means of the game machine transmits the billing information only after the game in question has been ended. This enables transmission of the billing information without affecting the operation of the game control unit during a game. Also, this ensures uninterrupted use of the game machine and swift supply of the latest billing information, because each time the billing information is sent to the billing server, it will include the information on the game that has just been played.

The present invention, with the characteristic features described above, provide a collective system for billing management of game machines installed in shops or the like via the communication network, in which the game machines are granted continuous use (with a limit) as long as they are properly used and the billing is carried out regularly or irregularly during the continuous use in accordance with the number of uses of each machine. Even if any of the machines is disconnected from the communication network either willfully or through a network failure, the billing is made accurately on a pay-per-use basis, and also, proper restrictions are imposed on unauthorized use such as using the machines in a stand-alone state on purpose. Furthermore, by varying the limit to the usable number granted to each game machine (continuous use limit) depending on the situation, the use of each machine can be managed flexibly and properly. In the event of a malfunction in a game machine, a service person on site can access the website of the billing server from the terminal device that has communication functions such as a mobile phone, and can search, browse, or change the billing information stored in the billing server, which enables the person to specify the cause of the malfunction of the game machine easily and to take proper measures quickly.

BRIEF DESCRIPTION OF THE DRAWINGS

These and other objects and advantages of the present invention will become clear from the following description with reference to the accompanying drawings, wherein:

FIG. 3 is a diagram illustrating one example of data contents recorded in a game main board memory of the game machine according to one embodiment of the invention;

DETAILED DESCRIPTION OF THE PREFERRED EMBODIMENTS

Figure 1:
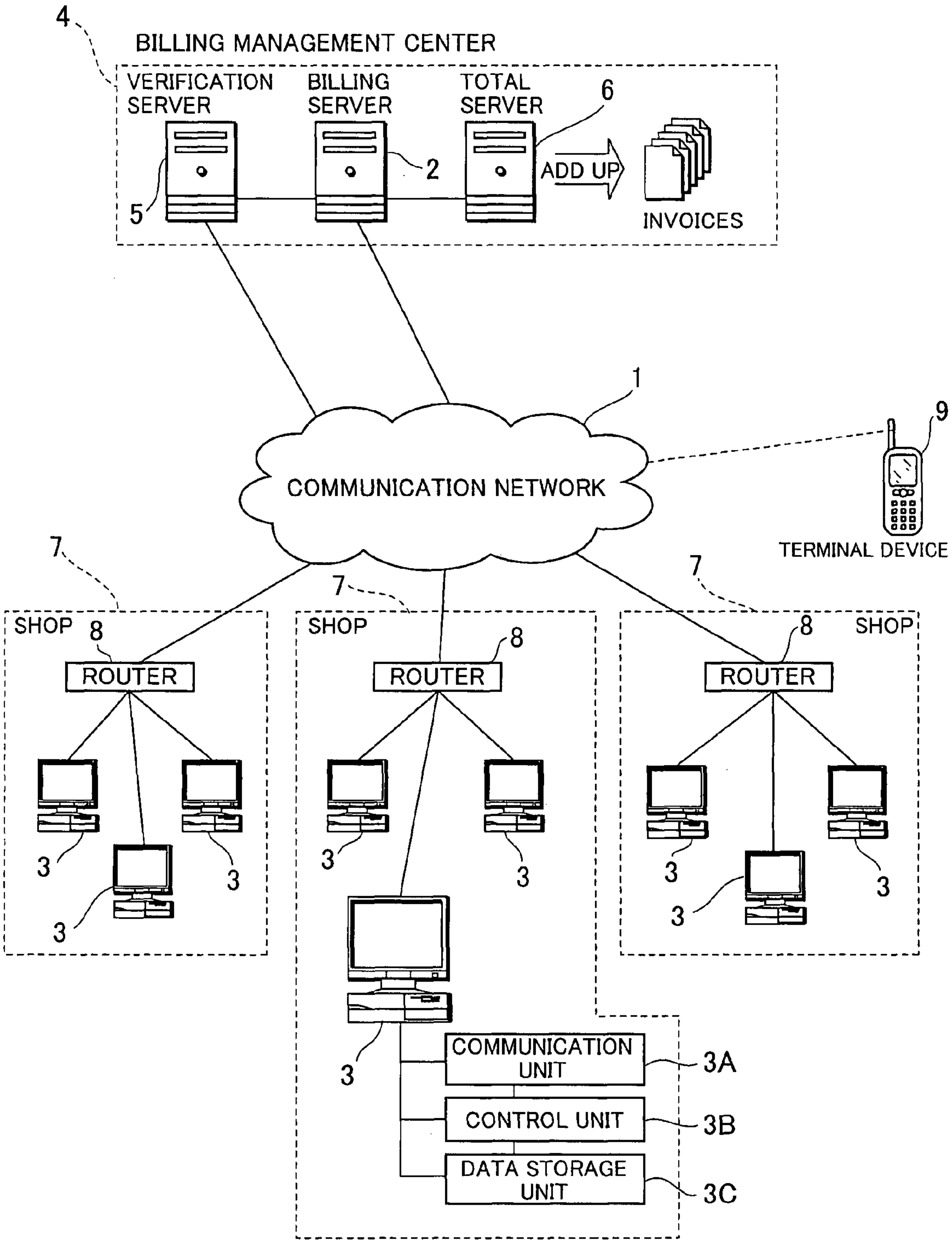
FIG. 1 is a diagram illustrating the overall structure of a billing management system according to one embodiment of the present invention.

Preferred embodiments of the present invention will be hereinafter described with reference to the drawings. FIG. 1 is a diagram for explaining the overall structure of the billing management system according to one embodiment of the present invention. The billing management system includes a billing server 2 connected to a communication network 1 and game machines 3 that can transmit and receive information to and from the billing server 2 via the communication network 1. The billing server 2 manages the use of the game machines 3 and bills per use on the basis of the billing information transmitted from the game machines 3 to the billing server 2.

In the illustrated example, the billing server 2 is set in a billing management center 4 that exists on the communication network. The center 4 also includes a verification server 5 connected to the communication network 1 and the billing server 2, and a total server 6 for adding up the billing results of the billing server 2 to issue invoices. These servers are computers having communication functions. A billing management program allows the billing server to perform the processing described later.

Also in the illustrated example, the game machines 3 are installed in shops 7 such as video arcades. Each shop 7 has a plurality of game machines 3, which are collectively connected via a router 8 and the communication network 1 to the billing server 2 and/or the verification server 5. The communication network 1 can be a public line such as the Internet or a public phone line, or a private line, or any other types of networks. A terminal device denoted with reference numeral 9 has communication functions so that it can connect to the billing server 2 or the verification server 5 through the communication network 1, and search, browse, and change the settings of the billing information of each game machine 3 and game machine information generated by the billing server on the basis of the billing information, these being stored in the billing server.

The game machine 3 basically includes a communication unit 3A, a control unit 3B, and a data storage unit 3C: It can be of any type, such as the one played by controlling the game information shown on the display (display unit) through input operation, or the one played by controlling mechanical movements through input operation, irrespective of whether it is an arcade video game machine, a home game machine, or a portable game machine. Also, not to mention the type that is played independently, the game machine 3 can be of the type that is played with a software provided through the communication network, or that can exchange information with another game machine 3 through the network.

This embodiment of the present invention presupposes that the server administrator has leased the game machines 3 to game machine administrators (shop managers) partly or entirely with or without consideration, and that the server administrator bills the game machine administrators regularly or irregularly on a pay-per-use basis, and the game machine administrators pay the bills or the usage fee to the server administrator.

Figure 2:
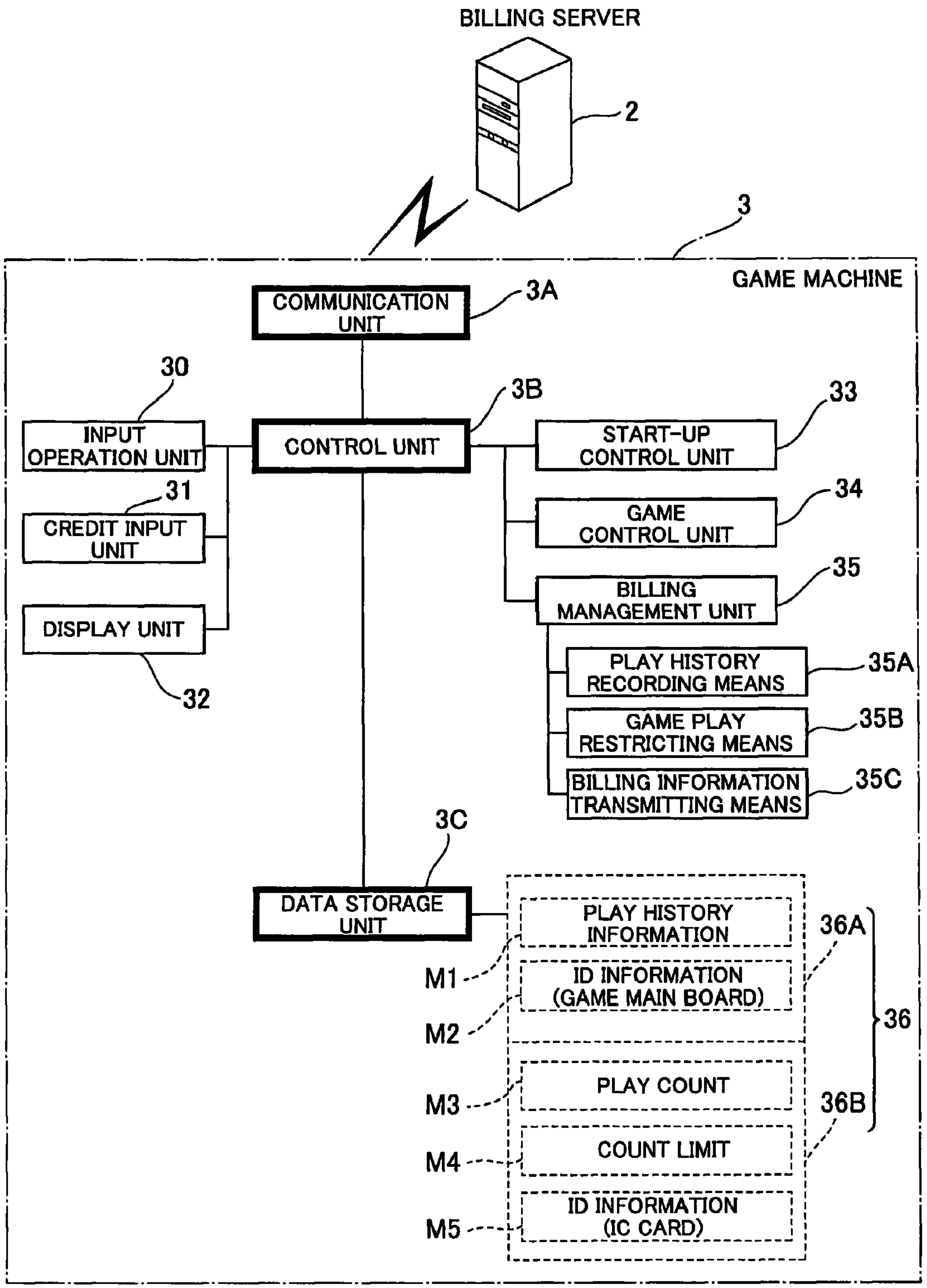
FIG. 2 is a diagram illustrating one example of a game machine in the billing management system according to one embodiment of the invention.

FIG. 2 shows one example of the game machines 3 described above. As mentioned above, the game machine 3 basically includes a communication unit 3A, a control unit 3B, and a data storage unit 3C. The example shown here is an arcade game machine that is played by interacting with the game information on the display. Therefore the machine includes an input operation unit 30 for sending input signals to the control unit 3B, a credit input unit 31 for sending a credit input signal to the control unit 3B when coins or the like are inserted, and a display unit 32 for displaying game information in accordance with the game control signals from the control unit 3B.

The control unit 3B includes a start-up control unit 33 that permits a game to be started in response to the input signal from the credit input unit 31, a game control unit 34 that executes the game program in response to the input signals from the input operation unit 30, and a billing management unit 35 that manages the billing of the game machine 3.

The game control unit is configured to include, for example, a memory for storing the game program and images and music data, a CPU for executing the game program, a work memory for storing the program or data temporarily while the CPU executes the program, an image processing unit for generating various images that are shown on the display unit 32 during the game, a sound generation unit for generating music, sound effects and the like, and a speaker for outputting the sound.

The data storage unit 3C forms a storage region 36. In the illustrated example, the storage region 36 is divided into a game main board memory 36A which is a memory on the game main board, and an IC card memory 36B which is a memory on the IC card that is connected to the data storage unit 3C. The IC card used here has a security function that blocks any access other than the data transmitted to or received from the data storage unit 3C, so as to prevent alteration of the data stored in the IC card memory 36B.

The data need not be stored separately in the game main board memory 36A and the IC card memory 36B and can be stored collectively in one of these memories.

The billing management unit 35 in the control unit 3B includes play history recording means 35A, game play restricting means 35B, and billing information transmitting means 35C.

The play history recording means 35A records play history information M1 in the game main board memory 36A per each game played by the game control unit 34. The play history information M1 is recorded every time date and time information for the play of a game is created (date and time when the game ended or the credit was consumed). Together with this date and time information, the type of the game played (game ID, item code or the like) and the credits that were consumed in one game are stored in one record. In addition to the play history information M1, the identification information (game main board ID or shop ID) M2 for specifying the game machine 3 is recorded in the game main board memory 36A per each record.

FIG. 3 is a diagram illustrating one example of data contents recorded in the game main board memory 36A. For example, one unit of play history information M1 with an allocated record number is recorded for each date and time of the end of a game. This one unit of play history information M1 can contain the game ID and credit consumption data in addition to the date and time of the end of the game. The credit consumption data would be necessary if the amount of consumed credits is different for each type of the game. If the game is of the type that consumes the credits as the game proceeds, the billing can be made in accordance with the consumed credits by recording the play history information M1 for each date and time when the credits are consumed. The data in the game main board memory 36A is all deleted when the billing information is transmitted once. When the number of data records in the game main board memory 36A exceeds a preset limit (when the storage region is full with play histories M1), the game control unit is disabled to stop the game play operation.

The game play restricting means 35B counts up the play count M3 in a storage region of the IC card memory 36B every time play history information M1 is recorded in the game main board memory 36A. The counted-up play count M3 is compared with a count limit M4 preset in the storage region of the IC card memory 36B and when it has reached or exceeded the count limit M4, the game play restricting means 35B disables the game control unit 34 so that no games are played any more. In this example, the play count M3 is counted up every time play history information M1 is recorded, but one alternative is to count the number of games played on the basis of the progress of the game program of the game control unit and to count up the play count M3 irrespective of the records of the play histories M1.

The storage region in the IC card memory is set so that only increment (addition) of the play count M3 is possible, and every time one unit of the play history information M1 is recorded in the game main board memory 36A, the play count M3 is counted up. The counted-up play count M3 is compared with the count limit M4, and when M3≦M4, further game play is permitted, while, when M3>M4, the game control unit 34 is stopped so that games cannot be played any more.

When the billing information transmitting means 35C which will be described later transmits the billing information to the billing server 2, which in turn renews the count limit in the billing server 2, the game play restricting means 35B receives and sets the renewed count limit as a new limit in the IC card memory 36B.

The billing information transmitting means 35C transmits billing information containing the play histories M1 and the play count M3 to the billing server 2 through the communication network 1 at a preset timing by activating the communication unit 3A. The following are collectively transmitted as the billing information: The play history information M1, identification information (of the game main board) M2, the play count M3, the count limit M4, and the unique ID number allocated to each IC card M5, these being all recorded in the storage region 36. When the information is transmitted, the information in the game main board memory 36A is cleared (deleted), while the information in the IC card memory 36B is retained.

The timing at which the information is transmitted by the billing information transmitting means 35C can be appropriately set: For example, when the main power switch of the game machines 3 is turned on, or when the game machines are least used in 24-hour operating shops (for example, around 3:00 AM), or at any time slot. If a particular time is set, the billing information transmitting means 35C is activated at the set time using a timer in the control unit 3B. If a particular time slot is set, a particular time within that time slot is selected using random numbers and the timer is set.

Also, the billing information transmitting means 35C can be set so that, if a game is being played by the game control unit 34 at the set timing when the billing information is to be transmitted, the billing information is transmitted only after this current game is ended. This can be achieved by setting different flag bits for during the game is played and for when the game ends and by referring to the flag bit value when it is the set time. This way, the billing information can be transmitted without affecting the game that is being played.

Figure 4:
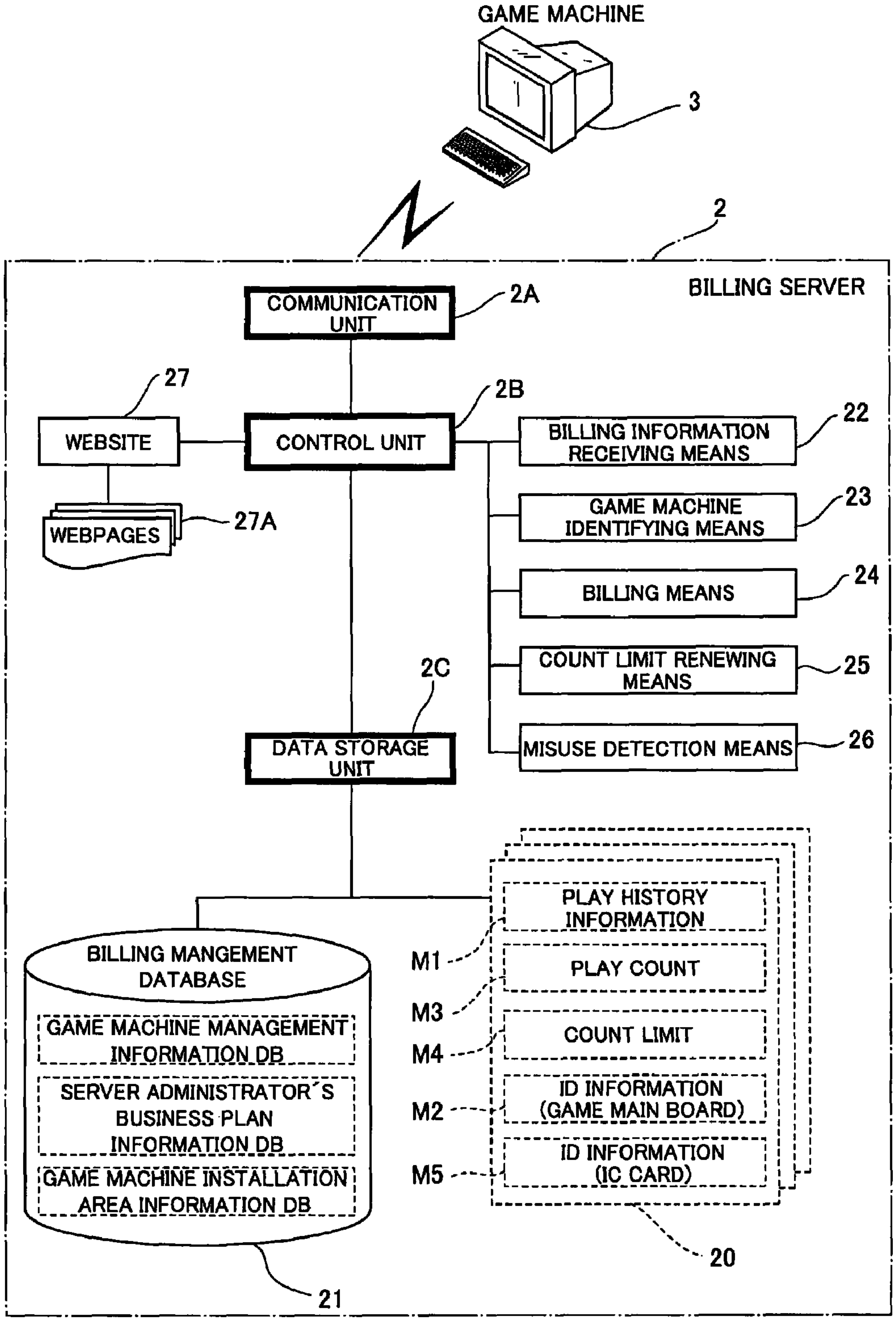
FIG. 4 is diagram illustrating one example of a billing server in the billing management system according to one embodiment of the invention.

FIG. 4 illustrates one example of the billing server 2. The billing server 2 is a computer basically including a communication unit 2A, a control unit 2B, and a data storage unit 2C. The communication unit 2A transmits and receives data via the communication network 1. The control unit 2B is operated by a billing management program that will be described later. The data storage unit 2C includes a storage region 20 for storing the received billing information for each game machine 3, and a billing management database 21 in which data necessary for the billing management is accumulated. The billing information includes play history information M1, identification information (of the game main board) M2, a play count M3, a count limit M4, and identification information (of the IC card) M5.

The storage region 20 for storing billing information and the billing management database 21 may both be set in the same data storage unit 2C as in this example, or they can be divided in separate storage units.

The billing management program enables the control unit 2B to function as billing information receiving means 22, game machine identifying means 23, billing means 24, count limit renewing means 25, misuse detection means 26, and a website 27 consisting of web pages 27A. If there is no need of identifying game machines 3, the billing information receiving means 22, the billing means 24, and the count limit renewing means 25 will be the main functions of the control unit.

The billing information receiving means 22 provides the function of receiving the billing information transmitted from the game machines 3. Upon the proper receipt of the information, the game machine identifying means 23, the billing means 24, the count limit renewing means 25, and the misuse detection means 26 are operated one after another. The received billing information (play history information M1, play count M3, count limit M4, and identification information M2 and M5) is stored for each game machine 3 in the storage region 20 of the data storage unit 2C.

On the basis of the identification information M2 and M5, the game machine identifying means 23 checks if the combination of the game main board (representing the game machine 3 itself) and the IC card is a proper one and if the combination of the game machine 3 and the shop where it is installed is a proper one, so as to identify the game machine 3 that has transmitted the billing information and to specify the customer to which an invoice should be sent.

The billing means 24 carries out the billing process for each game machine 3 on the basis of the received billing information. The results of the billing process are sent to the total server 6 and added up to produce invoices for each customer.

Every time the count limit renewing means 25 receives billing information, it renews the count limit M4 of the game machine 3 that has sent the billing information, and transmits the renewed count limit M4 back to the game machine 3. That is, when the billing information is recorded in the storage region 20, it retrieves the stored count limit M4 and carries out a renewal process that will be described later, and transmits the renewed count limit M4 to that game machine 3 that has been specified by the game machine identifying means 23.

How the count limit is renewed will be described later.

The misuse detection means 26 detects unauthorized use of the game machines 3 on the basis of the received billing information. It determines whether or not there is any breach of the lease contract in the use of the game machines 3, on the basis of the relationship between the play history information M1 and the play counts M3, the relationship between the current play count M3 and the previously received play count M3, and the receipt histories of the billing information.

The website 27 provides data from various web pages 27A to the terminal device 9. A game machine maintenance/service person can access the billing server 2 through the communication network 1 from the terminal device 9 such as a mobile phone to check the billing information or the like of the game machine 3 on the site. A "website" is a collection of web pages containing particular contents and written in accordance with certain rules and designs. A webpage is an individual document on the computer network or the World Wide Web. The characteristic feature of web pages is that each document contains the reference data to the URLs of other documents so that the web pages are cross-referenced with each other (hyperlinks) to allow the user to browse from one webpage to another and obtain various data. Most of these documents are configured with a markup document such as HTML or XHTML, a style sheet (that controls how the markup document should be presented/displayed), and images or music data. The web pages can be viewed using a Web browser on the terminal device side. Various software systems such as Flash, Java applets, and JavaScript are additionally used to expand the features of the Web browser to include the function of an application or an interface. Other software systems or technologies, such as CGI programs in the C language or Perl, JAVA servlets, JSP and ASP that allow a program to be embedded in PHP or HTML, are available to generate dynamic or interactive web pages. In the present invention, an application incorporated in the webpage searches the data in the storage region 20 on the basis of the information sent from the terminal device, or, a search engine provided in the storage region 2C searches the data in the storage region 20, via an interface incorporated in the webpage. According to the invention, therefore, the website 27 or the web pages 27A in the billing server store these data and programs.

Figure 5:
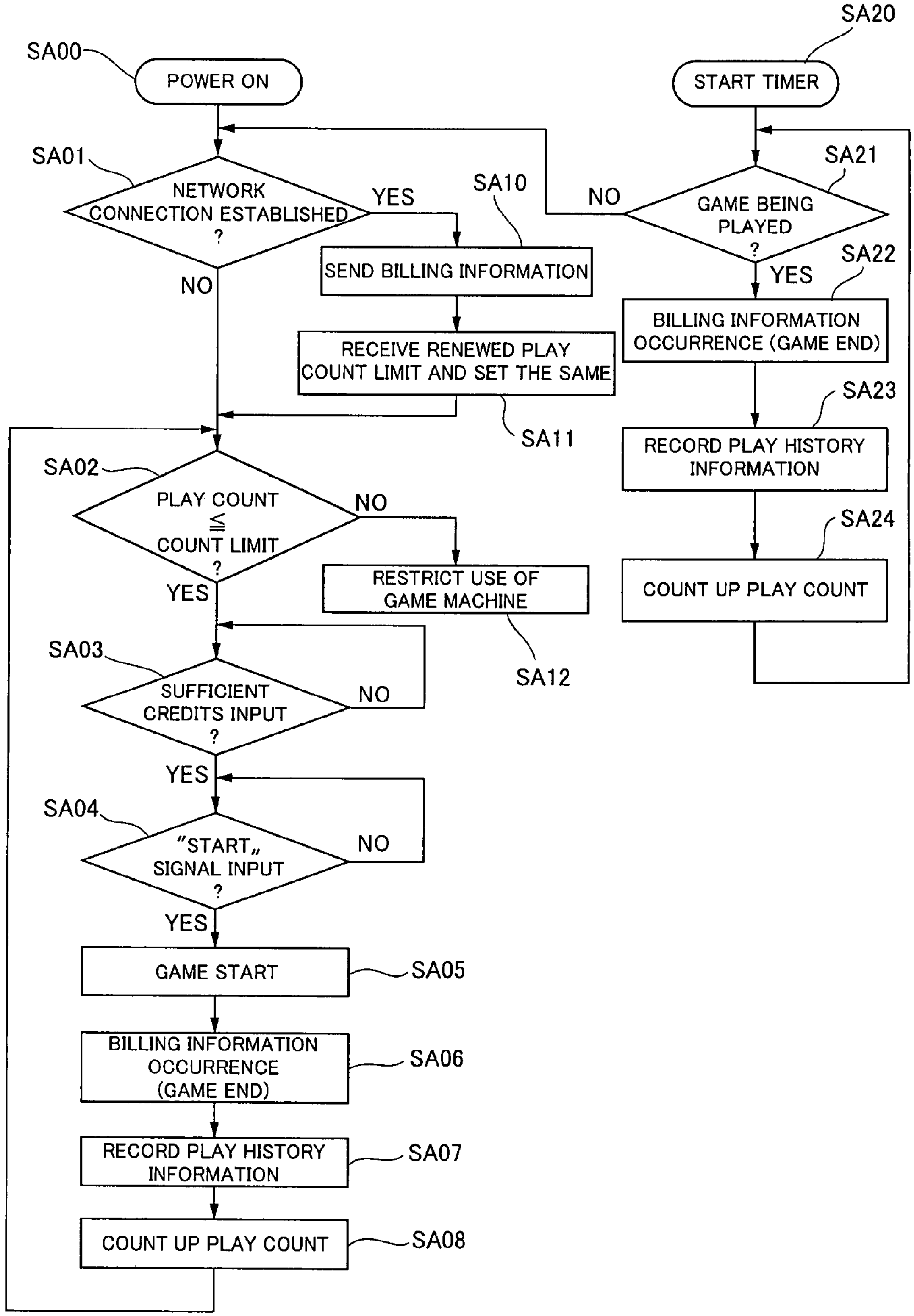
FIG. 5 is a flowchart of the basic operation of the game machine according to one embodiment of the invention.
Figure 6:
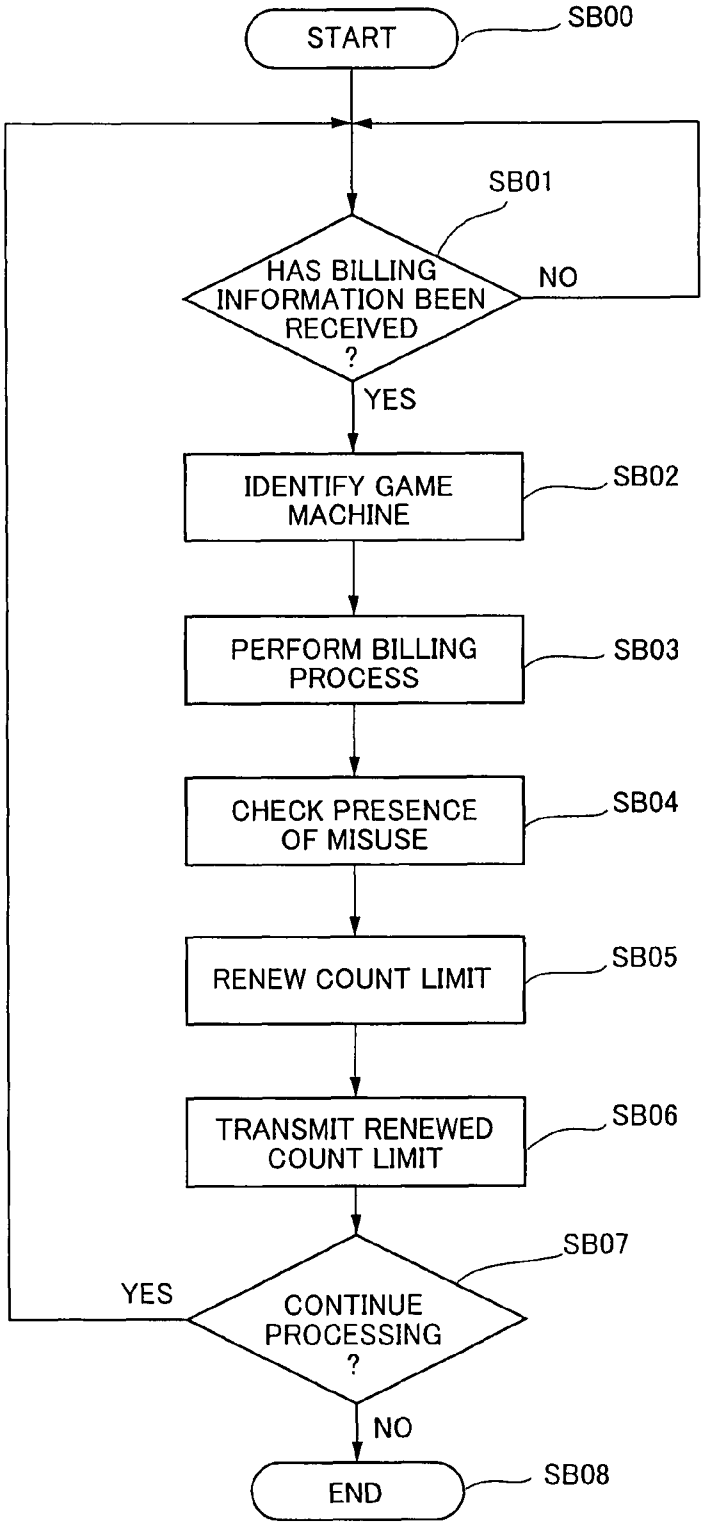
FIG. 6 is a diagram illustrating how the billing server works.

Next, the billing management method that uses the above system and how the billing management system works will be described. FIG. 5 is a flowchart of the basic operation on the side of the game machine 3, and FIG. 6 is a flowchart of the basic operation on the side of the billing server 2. The description will be made on one example in which the billing information transmitting means 35C described above is activated when the game machine 3 is turned on and at the time set by the timer. The process steps shown in the flowcharts of FIG. 5 and onwards are accomplished by various means and control units that function as required by the programs executed by the control unit 2B or 3B. Instead, various means or control units may be embodied as hardware and controlled to serve their functions.

The characteristic feature of the billing management method is that it includes: recording play history information (SA07) every time one game is played (every time one game ends, for example) with the game machine 3, counting up the play count every time the play history information is recorded (SA08), restricting the play of games in the game machine when the counted-up play count has reached or exceeded a set count limit (SA02, SA12), transmitting billing information (SA10) including the play history information and the play count to the billing server 2 via the communication network 1 at a set timing, receiving the billing information (on the billing server side) sent from the game machine 3 (SB01), carrying out a billing process per each game machine on the basis of the received billing information (SB02, SB03), renewing the count limit of the game machine 3 that has transmitted the billing information every time the billing information is received (SB05), transmitting the renewed count limit to the game machine that has transmitted the billing information (SB06), and receiving (on the game machine side) the renewed count limit and changing the current count limit to the new one (SA11).

The play history information is recorded every time one game ends because of the following reasons: If the play history information is recorded every time a credit value is input or every time one game is started, there is the possibility that false play history information may be recorded when the credit was actually not used (the game was actually not played) or the game could not be played properly because of a malfunction or the like of the game machine 3 after the game has started. With such false information that the game was played when it was actually not, the billing will not be done correctly in accordance with the actual number of games that were played.

In the example here, the play count is increased every time play history information is recorded, but the number of games that were played can be counted irrespective of the recording of the play history information.

The processing is done in the following manner in the game machine 3. With reference to FIG. 5, when the game machine 3 is turned on (SA00), network connection condition is determined (SA01), and if the connection has been successfully established, the billing information transmitting means 35C is activated so that the billing information is transmitted to the billing server 2 (SA10). The game play restricting means 35B receives the count limit that has been renewed on the billing server 2 side, changes the current value to the renewed value (SA11), and prohibits the use of the game machine (SA12) when the current play count equals to or exceeds the renewed count limit (SA02). If the play count has not exceeded the count limit (SA02), then the machine waits for an input of credits (SA03) and for an input of a start signal (SA04).

If the network connection is unsuccessful in step SA01, the billing information cannot be transmitted. In this case, too, the game play restricting means 35B is activated to compare the current play count with the stored count limit (SA02), and if the play count equals to or exceeds the count limit, the use of the game machine is prohibited (SA12). If the play count has not exceeded the count limit, then the machine waits for an input of credits (SA03) and for an input of a start signal (SA04).

Alternatively, when the network connection failed, the program in the game machine 3 may carry out the following processing: The difference between the play count and the count limit is calculated and determined whether or not it is smaller than a predetermined value, and if it is larger than that, the machine shifts into the state of waiting for an input of credits (in which a game demonstration screen may be displayed). If the difference is smaller than the predetermined value, the machine is controlled so as not to shift into the state of waiting for a credit input until a certain input operation is performed such as operation of a switch on the game machine housing or a maintenance switch inside the housing. The program may further include a processing step in which an error message that the machine cannot start the game is displayed on the game screen during the time when the machine does not shift into the state of waiting for a credit input.

In step SA03 where the machine waits for a credit input, the start-up control unit 33 checks the input signal from the credit input unit 31 and determines whether or not the input credits satisfies a preset level, and if yes, the game control unit 34 switches into the waiting state (SA04) where it waits for an input of a start signal from the input operation unit 30. When the start signal is input, the game control unit 34 starts the game (SA05).

As the game is played, every time billing information is created (SA06), the play history recording means 35A records play history information (SA07), and every time the play history information is recorded, the game play restricting means 35B counts up the play count (SA08). The billing information may be created (SA06) at the end of the game or when some credits are consumed during the game, which may occur, for example, when the player obtains an item or the like used in the game. The counted-up play count is compared with the count limit (SA02), and when it is the same or more than the count limit, further use of the game machine is prohibited (SA12). If the play count has not exceeded the count limit, the machine goes into the state of waiting for a credit input (SA03) and an input of a start signal (SA04).

The control unit 3B includes a timer and it is started (SA20) to activate the billing information transmitting means 35C (SA10) at a predetermined time (for example, 3:00 AM). After the timer is started, it is determined whether the machine is currently being operated or not on the basis of the processing state of the game control unit 34 (SA21), and if it is being operated, the play history recording means 35A records play history information (SA23) whenever the billing information is created (SA22), while the game play restricting means 35B counts up the play count (SA24), until the end of the game(s) (SA21). When the game ends, the process goes to step SA01 described above, and after confirming that the network communication is working, the billing information is sent to the billing server 2 by the billing information transmitting means 35C.

Meanwhile, the billing server 2 carries out the processing in the following manner: With reference to FIG. 6, after the start of the processing (SB00), the billing information receiving means 22 puts the server 2 into the state of waiting for receipt of the billing information (SB01). The server remains in this state until it receives the billing information.

When the billing information is received, the game machine identifying means 23 identifies or specifies the game machine 3 (SB02) on the basis of the identification information (game main board ID and shop ID) contained in the billing information, and specifies the customer to which the invoice should be sent. The billing means 24 carries out the billing process (SB03) in accordance with the received billing information, and the processed data per each customer is sent to the total server 6.

The misuse detection means 26 determines, as required, whether or not the use of the machines is unauthorized on the basis of the received billing information (SB04), and if any unauthorized use is found, it sets a new count limit in the following step of renewing the count limit (SB05) so as to prohibit further use of the machines. Alternatively, the misuse detection means imposes a restriction on the game machine 3 that has been specified by the game machine identifying means 23 by some other processing.

A wrong use of a game machine, which, for example, applies to a case where a game machine is transferred to another shop and used, can be found out by using information that is unique to each shop and that is necessary when transmitting the billing information (such as IP address) as the shop ID. The wrong use will be revealed when the shop ID sent with the game main board ID is compared with the registered shop ID information that has been stored in the billing server 2 in pair with the corresponding game main board ID. A program that carries out this process is installed and run in the server 2.

After the billing process (SB03), and after the misuse detection (SB04) carried out as required, the count limit renewing means 25 renews the count limit (SB05) of the game machine 3 that has sent the received billing information, and transmits the renewed count limit to the game machine 3 that has been specified by the game machine identifying means 23 (SB06). The processing may be continued further (SB07), in which case the server goes to the state of waiting for receipt of billing information (SB01) again, or may end (SB08).

According to this billing management system for game machines, games can be played even when the game machines 3 are not connected to the communication network 1, as long as there is an input of proper credits. Every time some credits are consumed (every time billing information is created) by playing a game, play history information is recorded in the game main board memory 36A, and every time the play history information is recorded, the play count is counted up.

Therefore, even in situations where the game machines 3 are frequently disconnected from the communication network 1, the billing server 2 can carry out the billing process accurately, on the basis of the billing information (including the play history information and the play count) that are sent by batch data entry. Even if the user attempts to use the game machines 3 continuously off-line, the user can play games only up to the number of the count limit because the count limit is not renewed until the billing information is transmitted to the billing server 2 through the communication network 1. This way, use of the game machines for an indefinite period of time without connecting to the billing server 2 for the billing process can be restricted.

Because of this feature that billing information needs to be sent to the billing server 2 to renew the count limit in order for the game machines 3 to be used continuously for a long time, it is ensured that the billing server 2 receives billing information at a predetermined interval or in a predetermined time slot for a long period of time, whereby accurate pay-per-use billing is possible for each of the game machines 3.

Next, specific embodiments of the count limit renewing means 25 and how it works in the billing server 2 will be described in further detail.

Figure 7:
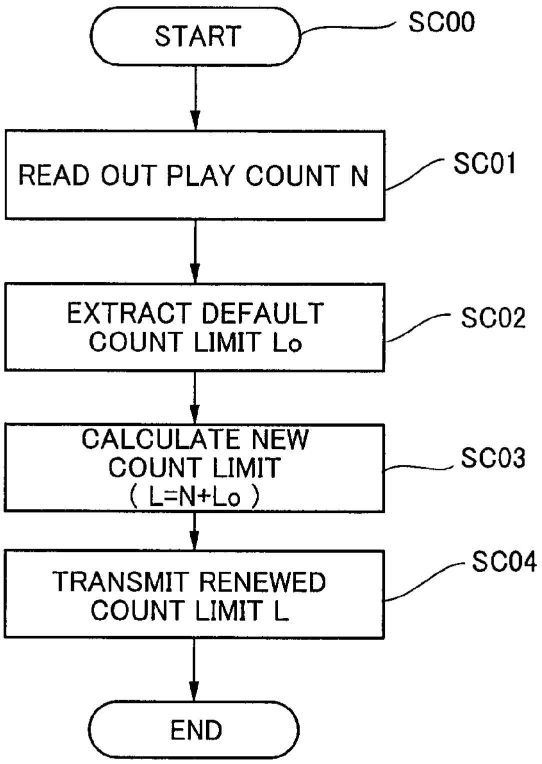
FIG. 7 is a flowchart of processing in count limit renewing means according to one embodiment of the invention.

FIG. 7 is a flowchart of the processing done in one embodiment of the count limit renewing means 25.

In this embodiment, when the count limit renewing means 25 is started (SC00), it reads out the current value N that has been received with the latest billing information from the play counts M3 stored in the storage region 20 of the data storage unit 2C (SC01). Then, the default count limit $L_0$ of the game machine 3 that has sent the billing information is extracted from the game machine management information database of the billing management database 21 (SC02). The game machine management information database is a database composed of the data of each game machine and of each received billing information that is stored in the storage region 20, and contains all the play history information, play counts, count limits, and dates and times of data reception of each game machine that were previously received. The default count limit $L_0$ can be extracted from this database.

A new count limit L is determined by adding the default count limit $L_0$ to the current play count N (SC03), and this new count limit L is sent to the game machine 3 that has been specified by the game machine identifying means 23 (SC04).

Thus every time the billing server 2 receives billing information, the count limit L of the game machine 3 is renewed by adding the count limit $L_0$ to the current play count N, that is, by transmitting billing information, the game machine 3 is granted further use by the added number of default count limit $L_0$.

That is, every time billing information is sent to the billing server 2 before the play count exceeds the count limit, the game machine 3 is granted the default number of times by which it can be used continuously, and therefore, the game machine 3 can be used continuously even with a poor network communication.

The count limit renewing means 25 may be provided on the side of the game machine 3. In this case, the game machine 3 is provided with a program that calculates the count limit L as with the processing done by the count limit renewing means 25 described above and records it as the count limit M4 when transmitting the billing information to the billing server 2.

Figure 8:
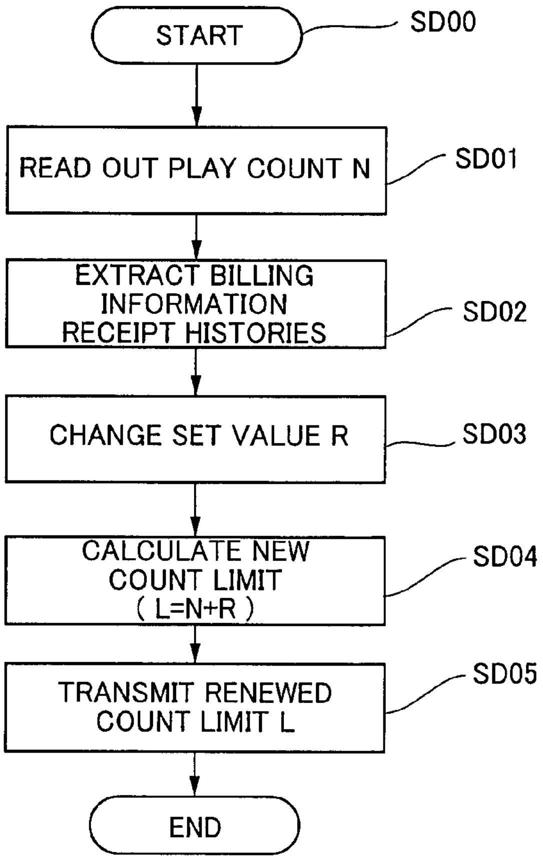
FIG. 8 is a flowchart of processing in count limit renewing means according to another embodiment of the invention.

FIG. 8 is a flowchart of the processing done in another embodiment of the count limit renewing means 25.

In this embodiment, when the count limit renewing means 25 is started (SD00), it reads out the current value N that has been received with the latest billing information from the play counts M3 stored in the storage region 20 of the data storage unit 2C (SD01). Then, receipt histories of billing information are extracted from the game machine management information database of the billing management database 21 (SC02). As mentioned above, the game machine management information database is a database composed of data of each game machine and of each received billing information that is stored in the storage region 20, and the billing information receipt histories are retrieved from this database.

A set value R is changed in accordance with the extracted receipt histories of billing information (SD03), and a new count limit L is determined by adding the set value R (plus or minus value) to the current play count N (SD04) with this new count limit L being sent to the game machine 3 that has been specified by the game machine identifying means 23 (SD05).

With this processing, the set value R equals to the number of times the game machine 3 can be used continuously. This is changed in accordance with the receipt histories of billing information for each of the game machines 3. For example, if the receipt histories show that certain game machines are situated in an area with a poor network connection, the set value R may be set higher so as to grant the game machines a sufficient number of times of continuous use and to permit the game machines to be used continuously despite network connection failures. On the other hand, if the receipt histories indicate that the network connection may have been disabled frequently on purpose, the set value R may be set lower so that the game machines can be used only a limited number of times and that any loss incurred by unauthorized use is minimized.

Figure 9:
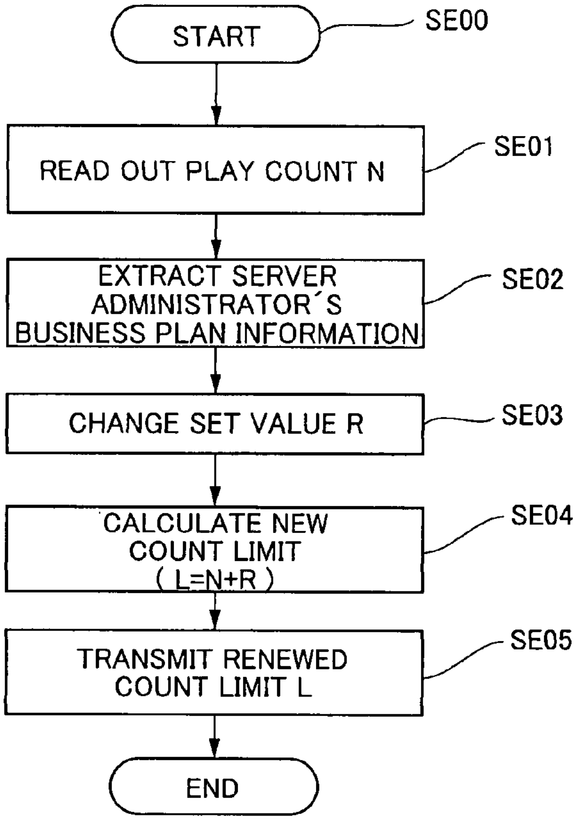
FIG. 9 is a flowchart of processing in count limit renewing means according to yet another embodiment of the invention.

FIG. 9 is a flowchart of the processing done in yet another embodiment of the count limit renewing means 25.

In this embodiment, when the count limit renewing means 25 is started (SE00), it reads out the current value N that has been received with the latest billing information from the play counts M3 stored in the storage region 20 of the data storage unit 2C (SE01). Then, server administrator's business plan information is extracted from the server administrator's business plan information database of the billing management database 21 (SE02). The server administrator's business plan information database is a database of operating dates or times of the server administrator, occupancy rates of the game machines for each day of the week and the like. Data such as business closing days of the server administrator or occupancy rates of certain game machines is retrieved from this database.

A set value R is changed in accordance with the extracted information (SE03), and a new count limit L is determined by adding the set value R to the current play count N (SE04), and then this new count limit L is sent to the game machine 3 that has been specified by the game machine identifying means 23 (SE05).

This processing enables flexible billing management in accordance with the business plan of the server administrator. For example, the set value R may be set lower to receive the play histories frequently for more stringent management of the game machines. This way, the number of times the game machines can be used continuously is limited and the game machines are made to send billing information frequently. On the other hand, when the server administrator cannot carry out the management process of the game machines for a long period of time because of a series of non-business days or the like, or, when billing information is received on a business closing day or on the day before the closing day, the set value R may be set higher so as to grant the game machines a large number of times of continuous use and to permit the game machines 3 to be used continuously free of the management schedule of the server administrator.

Figure 10:
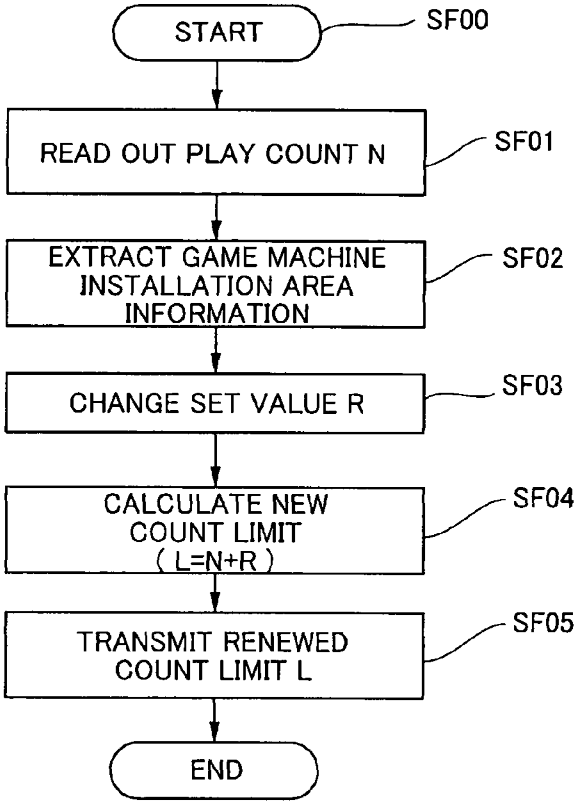
FIG. 10 is a flowchart of processing in count limit renewing means according to still another embodiment of the invention.

FIG. 10 is a flowchart of the processing done in a further embodiment of the count limit renewing means 25.

In this embodiment, when the count limit renewing means 25 is started (SF00), it reads out the current value N that has been received with the latest billing information from the play counts M3 stored in the storage region 20 of the data storage unit 2C (SF01). Then, game machine installation area information is extracted from the game machine installation area information database of the billing management database 21 (SF02). The game machine installation area information database provides information as to whether or not particular game machines 3 are situated in an area with a good network infrastructure, or whether some game machines 3 are in an area where it is likely to be used extremely frequently.

A set value R is changed in accordance with the extracted information (SF03), and a new count limit L is determined by adding the set value R to the current play count N (SF04), and then this new count limit L is sent to the game machine 3 that has been specified by the game machine identifying means 23 (SF05).

This processing facilitates management of discrete game machines 3 that are installed in a variety of areas. For example, for game machines that are situated in an area with a poor network infrastructure where connection failures occur frequently, the set value R may be set higher so as to grant the game machines a large number of times of continuous use and to permit the game machines 3 to be used continuously despite frequent network failures. Also, if the area information indicates that particular game machines 3 are expected to be used intensively, the set value R may be set higher so as to grant the game machines a sufficient number of times of continuous use and to permit the game machines 3 to be used continuously despite the intensive use.

Figure 11:
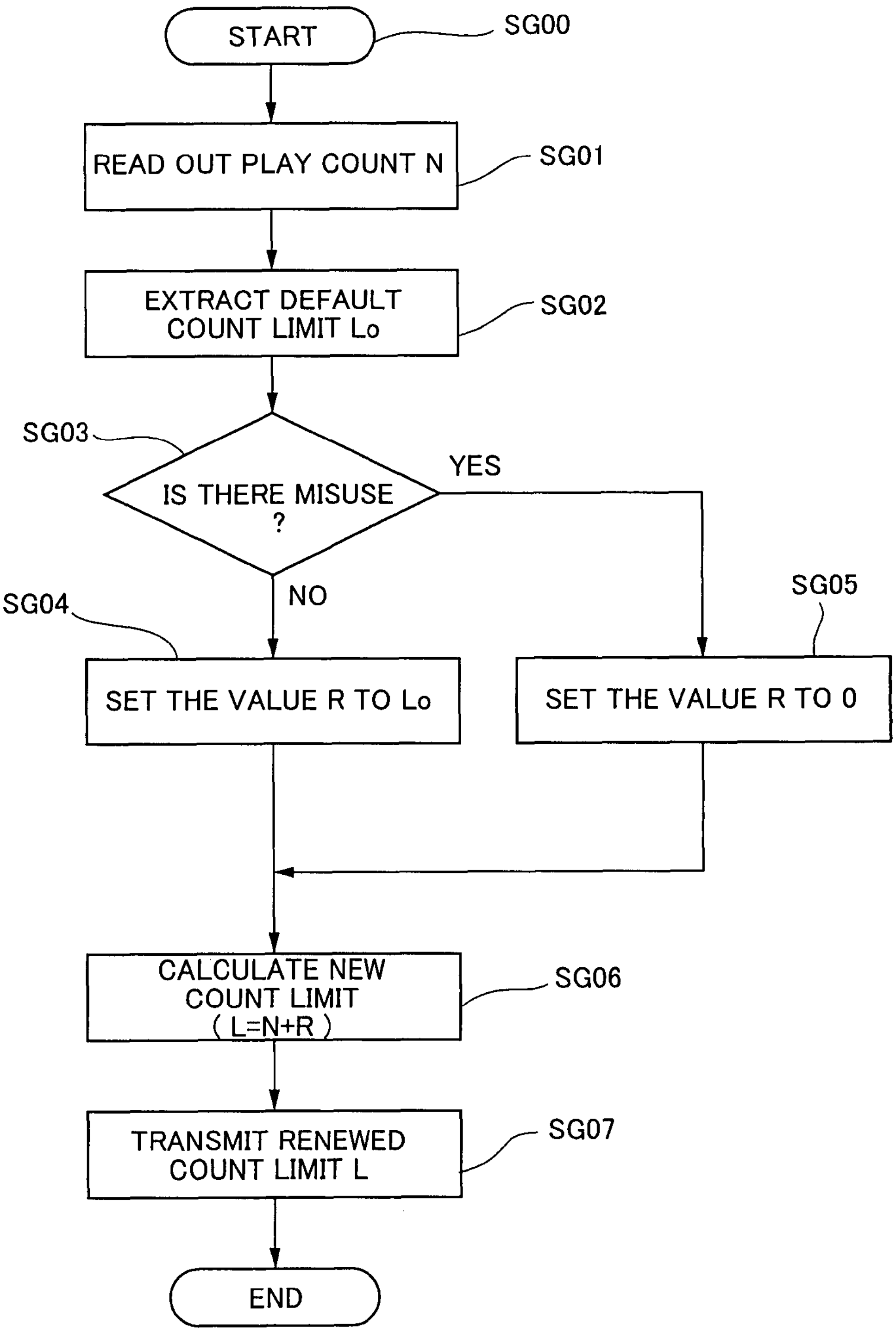
FIG. 11 is a flowchart of processing in count limit renewing means according to another embodiment of the invention.

FIG. 11 is a flowchart of the processing done in another embodiment of the count limit renewing means 25.

In this embodiment, when the count limit renewing means 25 is started (SG00), it reads out the current value N that has been received with the latest billing information from the play counts M3 stored in the storage region 20 of the data storage unit 2C (SG01). Then, the default count limit $L_0$ of the game machine 3 that has sent the billing information is extracted from the game machine management information database of the billing management database 21 (SG02).

If the misuse detection means 26 determines that there is a wrong use of particular game machines (SG03), a set value R is changed to 0 (SG05), and if not (SG03), the set value R is set equal to $L_0$ (SG04). A new count limit L is determined by adding the set value R to the current play count N (SG06), this new count limit L being sent to the game machine 3 that has been specified by the game machine identifying means 23 (SG07).

With this processing, as long as there is no unauthorized use of game machines, the count limit L of the game machine 3 is renewed by adding the default count limit $L_0$ to the current play count N every time the billing server 2 receives billing information. That is, by transmitting billing information, the game machine 3 is granted further use by the added number of times (default count limit $L_0$). On the other hand, if the received billing information indicates any unauthorized use of game machines, the set value R is changed to 0, thereby canceling the permission of further use and immediately disabling the game machine in question.

Next, how the billing management system of the present invention works will be described with reference to FIG. 12 to FIG. 15. In particular, the process of searching, browsing, or changing the billing information of each game machine 3 and the game machine information generated by the billing server 2 on the basis of the billing information will be described. The user can access the above information stored in the billing server 2 by viewing its website 27 from the terminal device 9 that has communication functions through the communication network 1.

Figure 12:
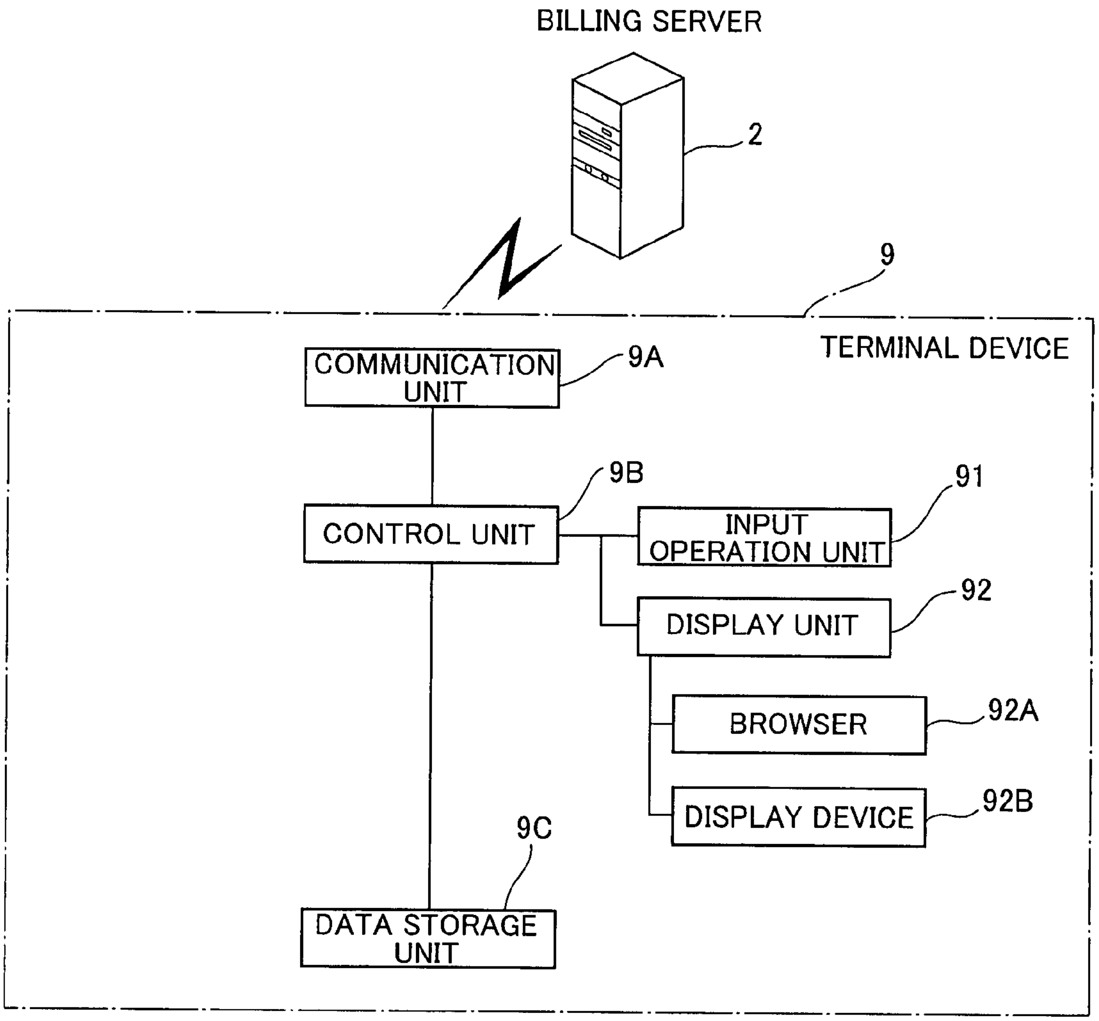
FIG. 12 is a diagram illustrating one example of a terminal device used in the billing management system according to one embodiment of the invention.

FIG. 12 illustrates one example of the terminal device 9. The device basically includes a communication unit 9A, a control unit 9B, and a data storage unit 9C. This example of the terminal device 9 is a mobile phone that allows interactive data entry to web pages 27A of the website 27 displayed on the screen. The device includes an input operation unit 91 that sends input signals to the control unit 9A, and a display unit 92 that controls display of images on the screen. The display unit 92 includes a browser 92A that converts the webpage 27A into the data that can be displayed on the screen, and a display device 92B such as a liquid crystal display to show the data converted by the browser 92A.

The terminal device 9 need not necessarily be a mobile phone but can be any portable terminal devices that are handy to carry with for the service person who does the maintenance work of the game machines 3, such as a PDA (Personal Digital Assistant) or a notebook PC with communication functions.

Figure 13:
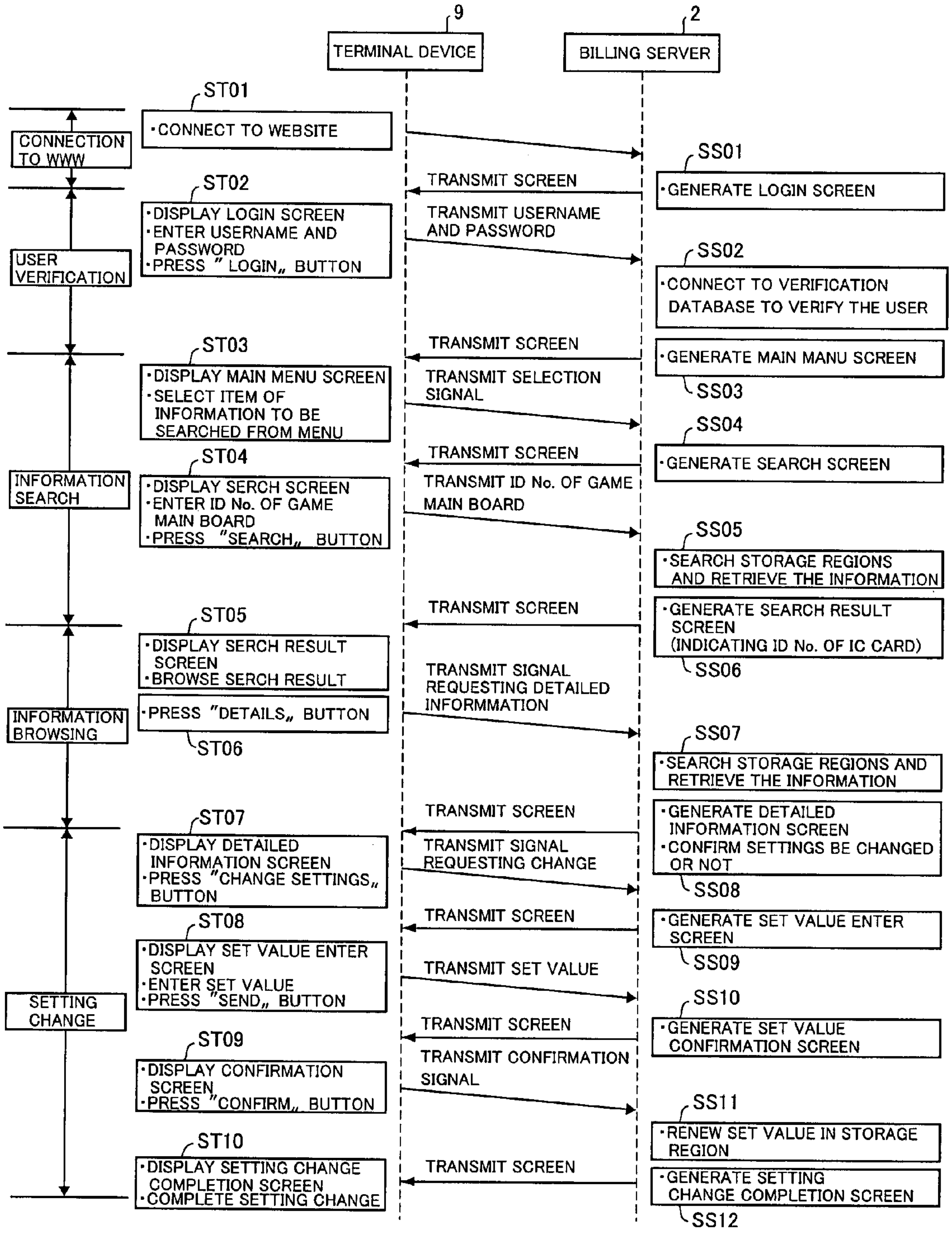
FIG. 13 is a sequence chart of the process of searching, browsing, and changing information in a website in one embodiment of the invention.

FIG. 13 to FIG. 15 are diagrams given for explaining the process of searching and browsing the billing information of each game machine 3 and the game machine information generated by the billing server on the basis of the billing information, and the process of changing the settings, by accessing the billing server 2 using the terminal device 9 described above. The billing information and the game machine information will be hereinafter collectively referred to as "billing information and the like." FIG. 13 is a sequence chart of one example of the process of searching and browsing the billing information and the like, and of changing the settings, in the website 27. FIG. 14A to FIG. 14D and FIG. 15A to FIG. 15D are diagrams illustrating examples of screens displayed on the display device 92*b* of the terminal device 9 in various process steps.

The person who wishes to search or browse the billing information or the like or to change the settings using the terminal device 9 first sends the URL (Uniform Resource Locator) of the website 27 from the terminal device 9 to access the website 27 of the billing server 2 through the communication network (ST01). Upon receipt of the URL from the terminal device 9, the billing server 2 generates a login screen such as the one shown in FIG. 14A and transmits the screen to the terminal device 9 to specify the user of the terminal device 9 (SS01). The terminal device 9 is connected to the billing server 2 at this stage.

Figure 14A:
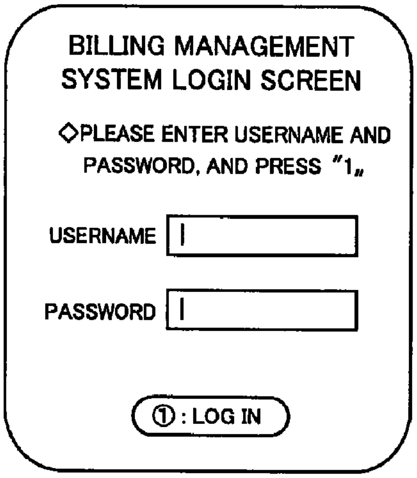
FIG. 14A to FIG. 14F are diagrams illustrating examples of screens displayed on a terminal device in one embodiment of the invention.
Figure 14B:
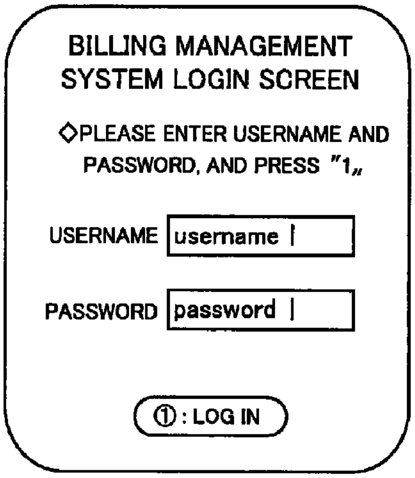

The terminal device 9 displays the login screen (FIG. 14A) on its display device 92*b*, and the user enters a username and a password as shown in FIG. 14B using the input operation unit 91 such as a press button or a stylus pen, and presses a "login" button (for example the number "1" button) (ST02). The username and the password are transmitted to the billing server 2, which, in turn, connects to the verification server 5 to match the received username and password with the registered username and password in the verification server 5 to verify the user (SS02). If the user verification is successful (SS02), the billing server 2 generates a main menu screen such as the one shown in FIG. 14C and sends the screen to the terminal device (SS03). If the user verification fails, the login screen is transmitted again.

Figure 14C:
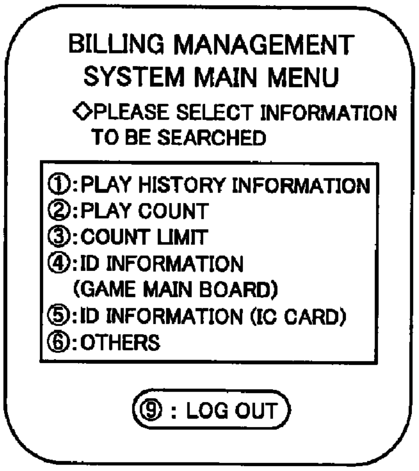
Figure 14D:
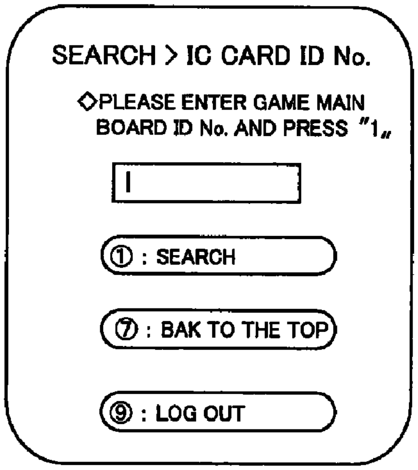

The user of the terminal device 9 selects an item of the information to be searched from the main menu displayed on the display device 92*b* (ST03). In this embodiment, as shown in FIG. 14C, the information that can be searched includes play history information, play counts, count limits, ID information of game main boards, ID information of IC cards, and other game machine information. The user can select one of the listed items of information by pressing a number button of the terminal device 9 corresponding to the number indicated on the left side of each item, or by touching the screen on the number.

One example of data search process will be described below, in which the IC card ID information has been selected (number "5" button has been pressed) in the selecting step (ST03) mentioned above. This applies to a case, for example, where the user wishes to check whether or not the combination of the ID numbers of the game main board and the IC card of a malfunctioning game machine is the correct, registered one. When the number "5" button is pressed (ST03) in the main menu shown in FIG. 14C, a select signal is sent to the billing server 2, which, in turn, generates a search screen such as the one shown in FIG. 14D and transmits it to the terminal device (SS04).

Figure 14E:
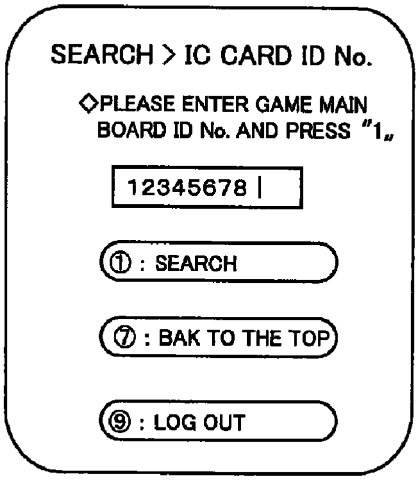

The search screen on the display device 92*b* prompts an input of the ID information of the game main board in question from the user of the terminal device 9. When the user enters the ID information that is provided on the game main board ("12345678" in this embodiment) as shown in FIG. 14E and presses the number "1" button to start the search (ST04), the ID information is transmitted to the billing server 2, which, in turn, searches the storage region 20 to retrieve the information (SS05), and generates a search result screen (SS06) such as the one shown in FIG. 14F indicating the IC card ID number ("12233344" in this embodiment), which is the search result, and transmits the screen to the terminal device. Thus the user can view the retrieved IC card ID number (ST05) in the search result screen (FIG. 14F) on the display device 92*b* of the terminal device 9. This way, the user can match the retrieved ID number with the one given on the IC card to check if the combination of the game main board and the IC card is the correct, registered one. If it turns out that the ID number on the game main board and the ID number on the IC card are a wrong combination, then the cause of the malfunction of the game machine 3 in question can be attributed to a wrong IC card being inserted in the game machine 3. In other words, it indicates the possibility that the game machine administrator (shop manager) might have replaced the IC card with an IC card of another game machine either accidentally or intentionally.

If the ID numbers of the game main board and the IC card are a correct combination, the game machine 3 in question can be identified as a properly registered machine, and therefore the user can view other billing information and the like of the game machine 3 by selecting the "details" (pressing the number "1" button) in the search result screen (FIG. 14F) on the terminal device 9.

Figure 14F:
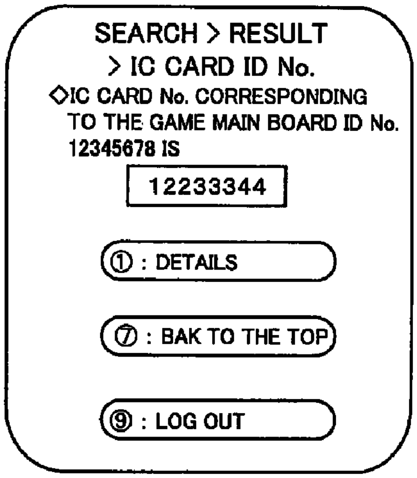
Figure 15A:
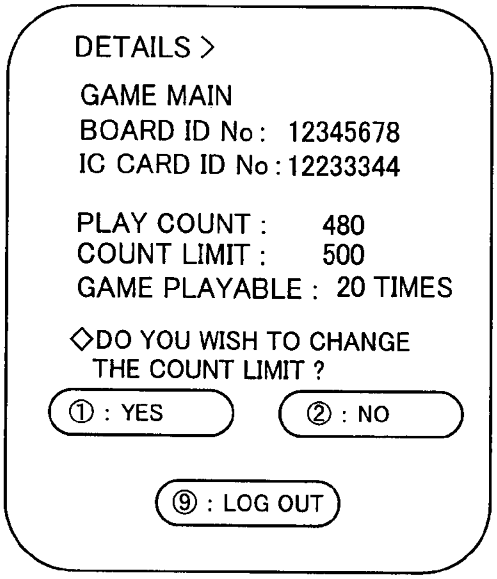
FIG. 15A to FIG. 15D are diagrams illustrating examples of screens displayed on a terminal device in one embodiment of the invention.

When the user selects the "details" (presses the number "1" button) in the search result screen shown in FIG. 14F (ST06), a signal requesting the details is transmitted to the billing server 2, which, in turn, searches the storage region 20 and retrieves the information (SS07), generates a screen showing the details such as the one shown in FIG. 15A including a message asking whether or not the settings need be changed (SS08), and transmits the screen to the terminal device. The detailed information screen may display, for example, the billing information of each game machine 3 stored in the storage region 20 of the billing server 2, and the remaining number of games playable ("20" in this embodiment), which is obtained by deducing the play count (480) from the count limit (500). In this embodiment, of the billing information details displayed in the screen (FIG. 15A), the count limit alone is changeable, and therefore the screen shown in FIG. 15A displays a message "Do you wish to change the count limit?"

The user presses the "yes" button (number "1" button) if s/he wishes to change the settings (ST07), or the "no" button (number "2" button) if not, to return to the main menu screen shown in FIG. 14C and to proceed to other processing. Or the user may press the "log out" button (number "9" button) to disconnect from the billing server 2 and to end the processing.

Figure 15B:
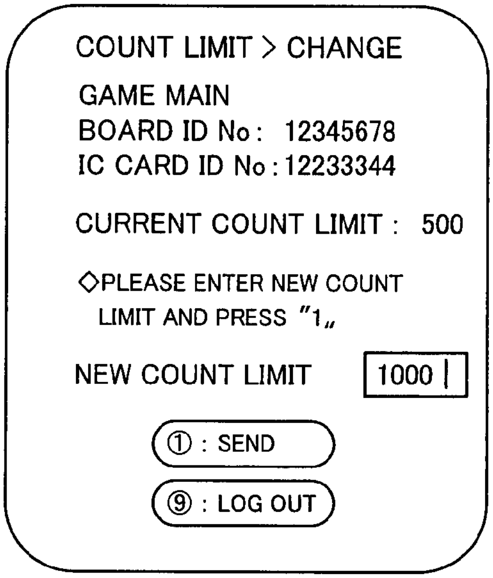

When the user presses the "yes" button in the screen shown in FIG. 15A (ST07), a change command signal is transmitted to the billing server 2, which, in turn, generates a set value enter screen for allowing the user to change the set value (SS09) and transmits the screen to the terminal device 9. The user enters a new count limit ("1000" in this embodiment) as shown in FIG. 15B in the set value enter screen on the display device 92*b* of the terminal device 9, and presses the "send" button (number "1" button) (ST08) to transmit the new value. When the new value is received, the billing server 2 generates a confirmation screen such as the one shown in FIG. 15C to prompt confirmation of the new value from the user (SS10) and transmits the screen to the terminal device 9. The user sees the new value on the confirmation screen and presses the "yes" button (number "1" button) to confirm the setting (ST09), or "go back" button (number "2" button) to return to the set value enter screen (FIG. 15B) and enter the value again.

Figure 15C:
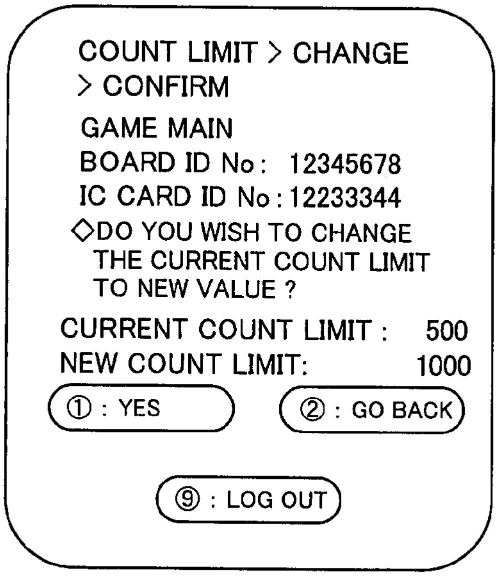
Figure 15D:
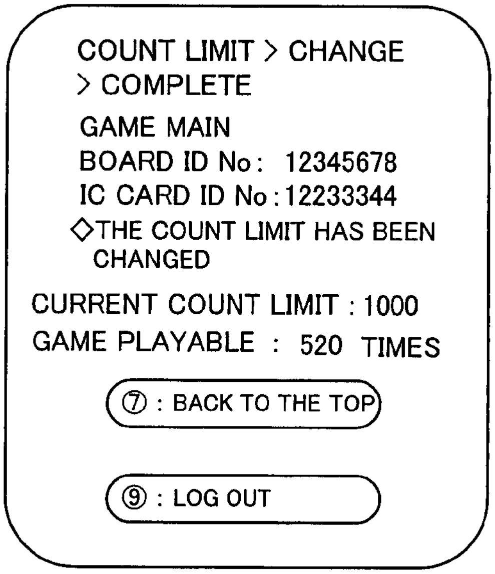

When the user presses the "yes" button in the confirmation screen shown in FIG. 15C (ST09), a confirmation signal is transmitted to the billing server 2, which, in turn, changes the count limit M4 in the storage region 20 to the newly set value ("1000") and stores the same (SS11), generates a screen indicating the completion of the setting change such as the one shown in FIG. 15D (SS12), and transmits the screen to the terminal device 9. This change in the settings is completed when the service person (terminal device user) or the game machine administrator (shop manager) transmits billing information of the game machine 3, upon which the billing server 2 sends the renewed billing information back to the game machine 3, and the storage region 36 of the game machine 3 is renewed in accordance with the new billing information (ST10). The user of the terminal device 9 may press the "back to the top" button (number "7" button) in the setting change completion screen shown in FIG. 15D to go back to the main menu screen shown in FIG. 14C and to proceed to other processing, or press the "log out" button (number "9" button) to disconnect from the billing server and to end the processing.

Figure 16:
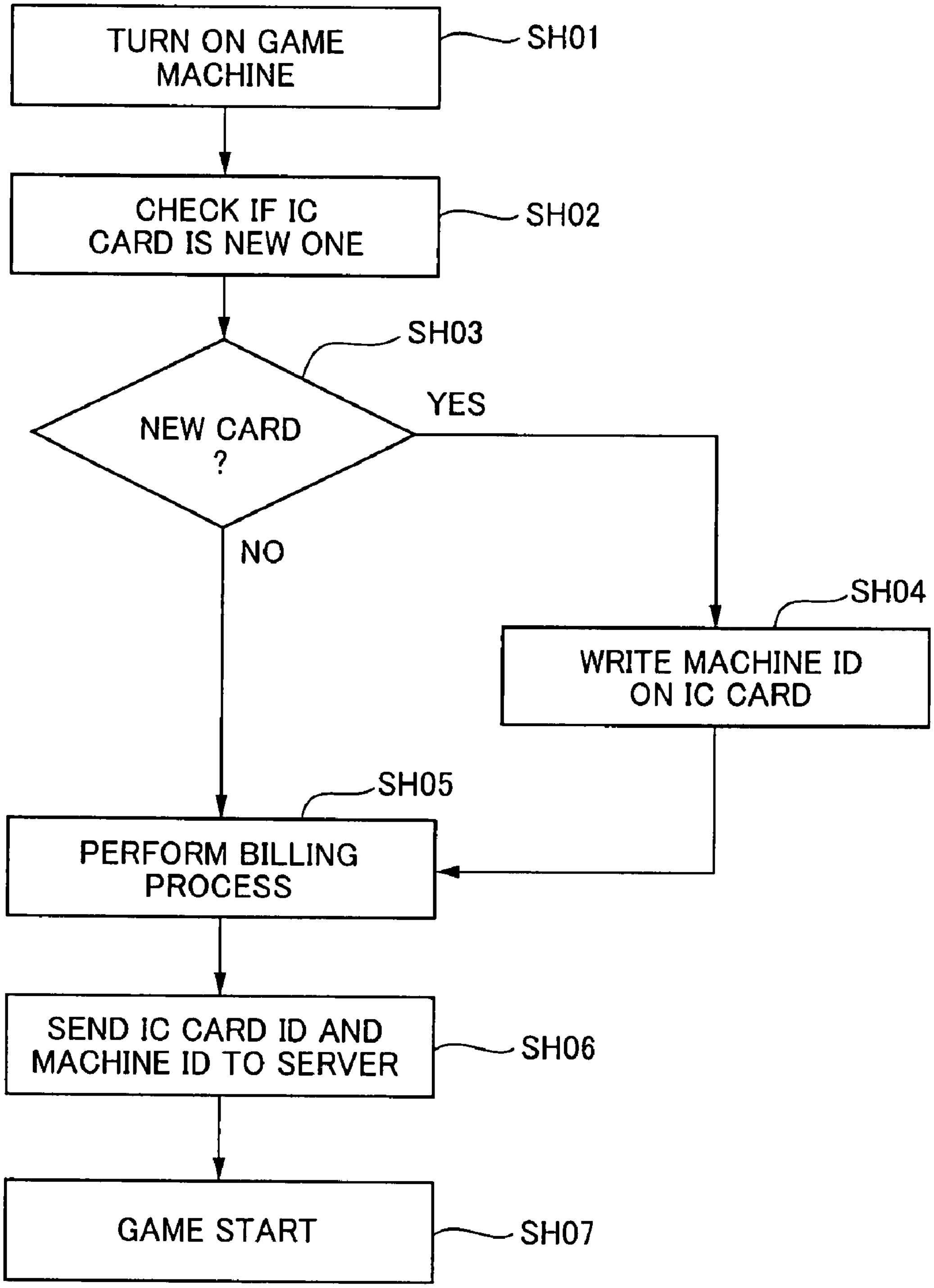
FIG. 16 is a flowchart of the process when the game machine is started up in one embodiment of the invention.

Next, the processing at the start of the game machine 3 according to the invention will be described with reference to FIG. 16. FIG. 16 is the flowchart of the processing done in the game machine 3 from when it is turned on until a game can be started.

When the game machine is turned on (SH01), the control unit 3B determines whether or not the IC card inserted in the game machine 3 is a new one (SH02). Whether the IC card is a new one or not is determined as follows: Each IC card is given its unique identification data (ID) at the factory, which is not rewritable. The IC card has a region for storing the identification information (ID) of the game main board of the game machine 3. When the game machine 3 is turned on, the control unit 3B accesses this storage region of the IC card to check if the game main board ID has been stored in this region or not. If the game main board ID is stored there, the control unit 3B determines that the IC card has been used before, and if not, the control unit 3B determines that the IC card is a new one.

If the IC card is determined to be a new one in this checking step (SH03), the game main board ID is written on the IC card (SH04), the play history information M1 and the play count M3 are transmitted to the billing server 2, which is the billing process (SH05), and the IC card ID and the game main board ID are transmitted to the billing server 2 (SH06). If the IC card is determined to be a used one in the checking step (SH03), the billing process is performed (SH05), and the IC card ID and the game main board ID are transmitted to the billing server 2 (SH06). The billing server 2, upon receipt of the billing information mentioned above from the game machine 3, transmits billing information including a renewed count limit back to the game machine 3. The game machine 3 carries out the processing for renewing and storing the value in the storage region 36 of the data storage unit 3C in accordance with the renewed billing information sent from the billing server 2, whereupon a game can be started in the machine (SH07).

According to the embodiments of the present invention described above, in a collective system for billing management of game machines 3 installed in shops or the like via the communication network 1, the game machines 3 are granted continuous use (with a limit) as long as they are properly used and the billing is carried out regularly during the time span of the continuous use on the pay-per-use basis.

Even if particular machines are disconnected from the communication network 1 either willfully or through a network failure, the machines are not immediately disabled but given a margin before the use of the machines is prohibited, this being in consideration of the cases where the cause of the disconnection is unknown. Accurate billing is made, when the connection is established again, on the pay-per-use basis including the uses during the disconnected period, and also, proper restrictions are imposed on unauthorized use such as using the machines in a stand-alone state on purpose. The limit to the usable number granted to each game machine 3 (continuous use limit) may be varied depending on the situation so that the use of each machine is flexibly and properly managed.

In case of a malfunction in a game machine 3, a service person on site can access the website 27 of the billing server 2 from the terminal device 9 that has communication functions such as a mobile phone, and search, browse, or change the billing information stored in the billing server, which enables the person to specify the cause of the malfunction of the game machine 3 easily and to take proper measures quickly.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A billing management system for a game machine comprising: a billing server connected to a communication network and a game machine that can transmit and receive information to and from the billing server through the communication network, wherein:

said billing server performs a billing management process on the basis of billing information sent from said game machine to said billing server on a pay-per-use basis;

said game machine comprises a game control unit executing a game program in accordance with an input signal, a game play restricting unit counting up a play count every time a game is played by the execution of said game program and restricting the execution of the game program in said game control unit when the counted-up play count reaches or exceeds a preset count limit, and a billing information transmitter transmitting billing information to said billing server through the communication network at a preset timing, the billing information including at least the play count;

said billing server comprises a billing information receiver receiving the billing information sent from said game machine, a billing unit performing a billing process for each game machine on the basis of the received billing information, and a count limit renewing unit which, every time the billing server receives said billing information, renews the count limit of said game machine that has transmitted the billing information and transmits the renewed count limit back to said game machine that has transmitted the billing information; and the game play restricting unit of said game machine receives the renewed count limit and changes a current count limit to said renewed value.

2. The billing management system according to claim 1, wherein said count limit renewing unit renews said count limit by adding a default count limit to said received play count.

3. The billing management system according to claim 1, wherein said count limit renewing unit renews said count limit by adding a set value to said received play count, said set value being changed in accordance with receipt histories of billing information for each game machine.

4. The billing management system according to claim 1, wherein said billing server includes business plan information of a server administrator, and said count limit renewing unit renews said count limit by adding a set value to said received play count, said set value being changed in accordance with said business plan information.

5. The billing management system according to claim 1, wherein said billing server includes installation area information on an installation area of said game machine, and said count limit renewing unit renews said count limit by adding a set value to said received play count, said set value being changed in accordance with said installation area information.

6. The billing management system according to claim 1, wherein said billing server includes misuse detection unit detecting unauthorized use of said game machine on the basis of the received billing information, and said count limit renewing unit renews said count limit by adding a set value to said received play count, said set value being changed to zero if said misuse detection unit detects unauthorized use.

7. The billing management system according to claim 1, wherein said billing server includes a website that can be accessed from a terminal device that has communication functions, said terminal device connected to said website enabling searching, browsing, and changing of said billing information and game machine information generated by said billing server on the basis of the billing information.

8. The billing management system according to claim 1, wherein said game machine includes play history recorder recording play history information every time a game is played by running said game program, and said game play restricting unit counts up said play count every time said play history information is recorded.

9. The billing management system according to claim 8, wherein said game machine includes a start-up control unit that enables a game to be started upon an input of credits, and said play history information includes information on how many credits have been consumed through playing previous games.

10. The billing management system according to claim 1, wherein, if a game is being played by said game control unit at a timing that is set for transmitting said billing information, said billing information transmitter of the game machine transmits said billing information after the game in question is ended.

11. A billing server connected to a game machine through a communication network, for performing a billing management process on the basis of billing information sent from said game machine on a pay-per-use basis, the game machine including game play restricting unit restricting the play of games when a play count that is counted up every time a game is played reaches or exceeds a preset count limit, the billing server comprising:

a billing information receiver receiving the billing information including at least said play count sent from said game machine;

a billing unit performing a billing process for each game machine on the basis of the received billing information; and a count limit renewing unit which, every time the billing server receives said billing information, renews said count limit of the game machine that has transmitted said billing information and transmits the renewed count limit back to said game machine.

12. The billing server according to claim 11, wherein said count limit renewing unit renews said count limit by adding a default count limit to a play count included in said received billing information.

13. The billing server according to claim 11, wherein said count limit renewing unit renews said count limit by adding a set value to a play count included in said received billing information, said set value being changed in accordance with receipt histories of the billing information for each game machine.

14. The billing server according to claim 11, further comprising business plan information of a server administrator, wherein said count limit renewing unit renews said count limit by adding a set value to a play count included in said received billing information, said set value being changed in accordance with said business plan information.

15. The billing server according to claim 11, further comprising installation area information on an installation area of said game machine, wherein said count limit renewing unit renews said count limit by adding a set value to said received play count, said set value being changed in accordance with said installation area information.

16. The billing server according to claim 11, further comprising misuse detection unit detecting unauthorized use of said game machine on the basis of the received billing information, wherein said count limit renewing unit renews said count limit by adding a set value to a play count included in said received billing information, said set value being changed to zero if said misuse detection unit detects unauthorized use.

17. The billing server according to claim 11, further comprising a website that can be accessed from a terminal device that has communication functions, said terminal device connected to said website enabling searching, browsing, and changing of said billing information and game machine information generated by said billing server on the basis of the billing information.

18. A billing management program run on a computer allowing it to function as a billing server that is connected to a game machine through a communication network and that performs a billing management process on the basis of billing information sent from said game machine on a pay-per-use basis, said game machine including game play restricting unit restricting the play of games when a play count that is counted up every time a game is played reaches or exceeds a preset count limit, said program allowing the computer to function as:

a billing information receiver receiving the billing information sent from said game machine, the billing information including at least said play count;

a billing unit performing a billing process for each game machine on the basis of the received billing information; and a count limit renewing unit which, every time said billing information is received, renews said count limit of the game machine that has transmitted said billing information and transmits the renewed count limit back to said game machine.

19. A game machine that can transmit and receive information to and from a billing server through a communication network, comprising:

a game control unit executing a game program in accordance with an input signal;

a game play restricting unit counting up a play count every time a game is played by the execution of said game program and for restricting the execution of the game program in said game control unit when said play count reaches or exceeds a preset count limit; and a billing information transmitter transmitting billing information to said billing server through the communication network at a preset timing, the billing information including at least said play count, wherein, after said billing information transmitter has transmitted billing information to said billing server, said game play restricting unit receives the count limit renewed by said billing server and changes a current count limit to said renewed value.

20. The game machine according to claim 19, further comprising play history recorder recording play history information every time a game is played by running said game program, wherein said game play restricting unit counts up said play count every time said play history information is recorded.

21. The game machine according to claim 19, further comprising a start-up control unit that enables a game to be started upon an input of credits, wherein said play history information includes information on how many credits have been consumed through playing previous games.

22. The game machine according to claim 19, wherein, if a game is being played by said game control unit at a timing that is set for transmitting said billing information, said billing information transmitter transmits said billing information after the game in question has been ended.

23. A billing management method for a game machine, the method using a billing management system including a billing server connected to a communication network and a game machine that can transmit and receive information to and from said billing server through the communication network, the system performing a billing management process on the basis of billing information sent from said game machine to said billing server on a pay-per-use basis, the billing management method for a game machine comprising:

a game play restricting step of counting up a play count every time a game is played by the execution of the game program in said game machine and restricting the play of games in said game machine when the counted-up play count reaches or exceeds a preset count limit;

a billing information transmitting step of transmitting the billing information to said billing server through the communication network at a preset timing, the billing information including at least said play count;

a billing information receiving step of allowing said billing server to receive the billing information sent from said game machine;

a billing step of performing a billing process for each game machine on the basis of the received billing information;

a count limit renewing step of renewing the count limit of said game machine that has transmitted the billing information every time said billing information is received, and transmitting the renewed count limit back to the game machine that has transmitted said billing information; and a changing step of allowing said game machine to receive said renewed count limit to change a current count limit to the renewed value.

24. The billing management method according to claim 23, further comprising a play history information recording step of recording play history information every time a game is played by running said game program, wherein said play count is counted up every time said play history information is recorded in said game play restricting step.

* * * * *